United States Patent [19]

Schultz et al.

[11] Patent Number: 4,713,780
[45] Date of Patent: Dec. 15, 1987

[54] ELECTRONIC MAIL

[75] Inventors: Thomas G. Schultz, Chicago, Ill.;
Andrew Gross, Bridgewater, N.J.;
Barbara Pappas, Massapequa Park;
George D. Shifrin, New York, both
of N.Y.; Lois Mack, Union City, N.J.

[73] Assignee: Express Communications, Inc., New York, N.Y.

[21] Appl. No.: 723,053

[22] Filed: Apr. 15, 1985

[51] Int. Cl.[4] .................. G06K 15/02; H04L 15/34
[52] U.S. Cl. .................. 364/514; 340/825.55;
364/518
[58] Field of Search .............. 364/514, 518, 522;
340/825.05, 825.5, 825.55; 179/2 DP; 358/141

[56] References Cited

U.S. PATENT DOCUMENTS

| | | | |
|---|---|---|---|
| 4,380,009 | 4/1983 | Long et al. | 340/825.55 |
| 4,384,307 | 5/1983 | Kuzmik et al. | 364/514 X |
| 4,445,214 | 4/1984 | Reynolds et al. | 340/825.5 X |
| 4,574,284 | 3/1986 | Feldman et al. | 340/825.52 |

Primary Examiner—Gary V. Harkcom
Assistant Examiner—H. R. Herndon
Attorney, Agent, or Firm—Fred A. Keire; William S. Frommer

[57] ABSTRACT

A method and apparatus for the electronic delivery of a document, originated at a local site by a source which has a printer output that normally is connected to a printer, to one or more remote locations having printers or display devices which may differ from the printer normally connected to the printer output of the document generating source. Printer command signals which normally are provided at the printer output are converted to character and position data which represent the respective characters and their horizontal and vertical positions on each page of the document. The character and position data are transmitted to a remote location, either directly or via a distribution unit which transmits a document to one or more remote locations, whereat the data is reconverted to a form of driving a printer or other display device, resulting in a line-for-line conforming copy of the original.

62 Claims, 7 Drawing Figures

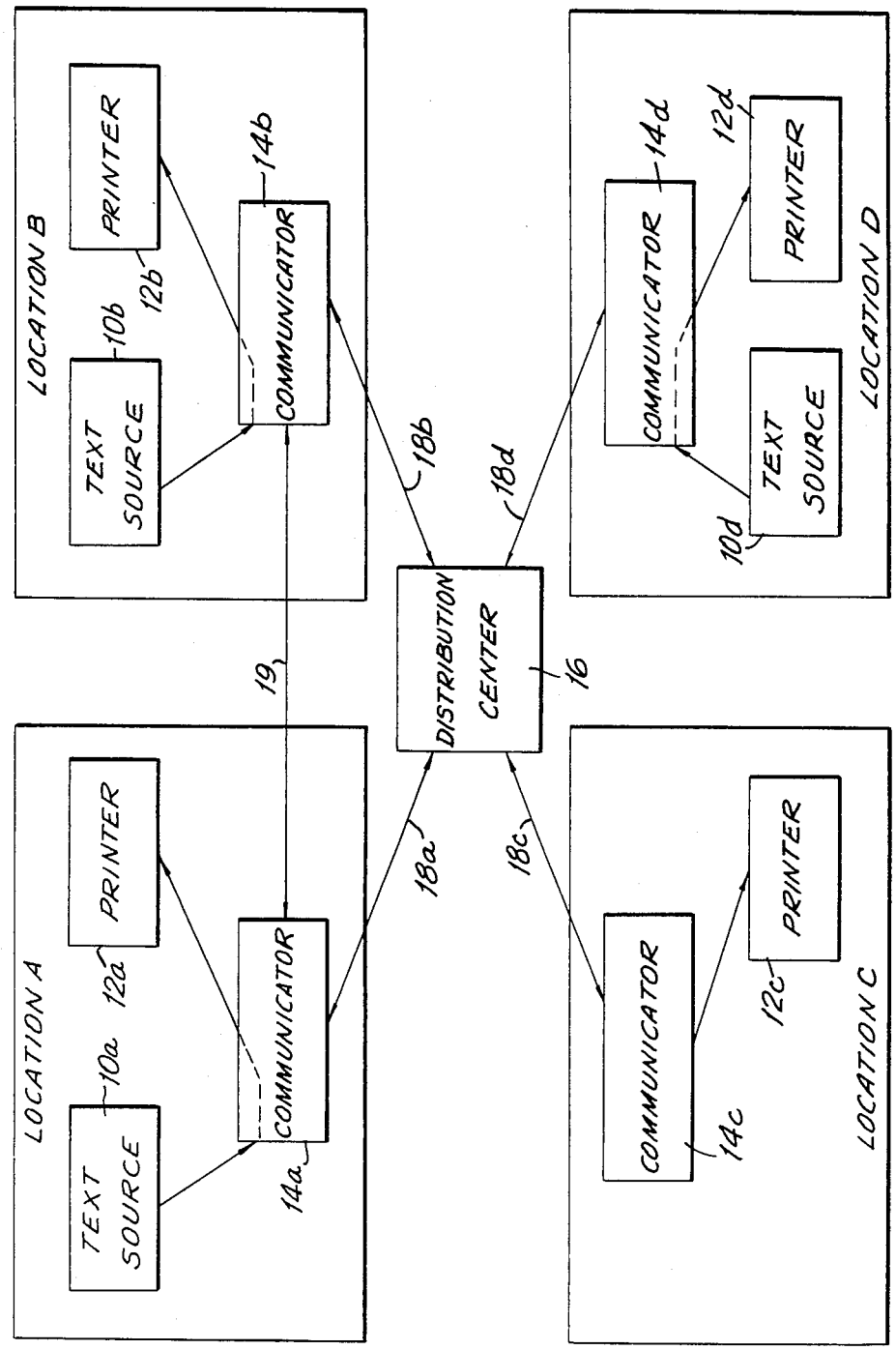

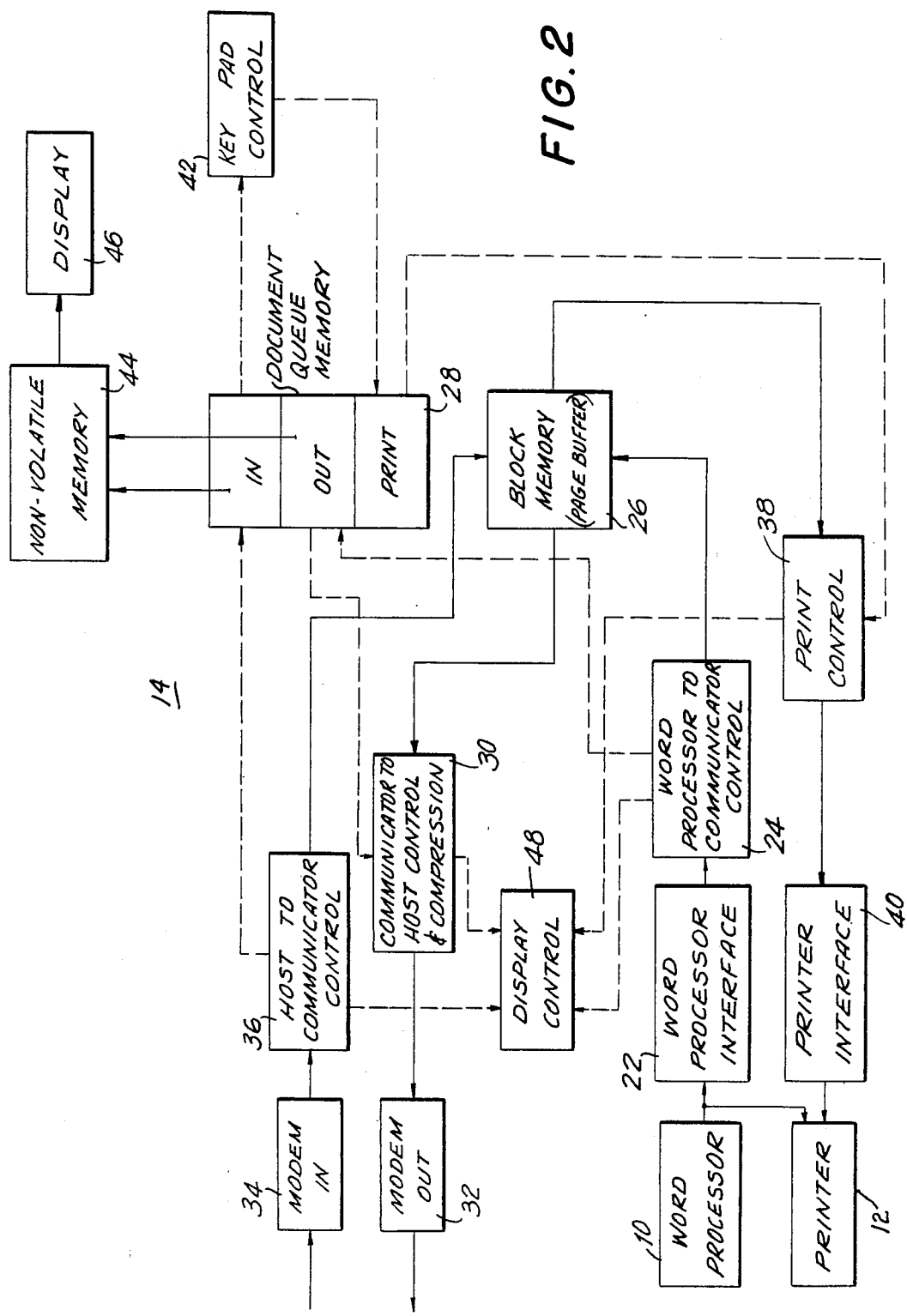

ELECTRONIC MAIL

BACKGROUND OF THE INVENTION

This invention relates to a method and apparatus for transmitting a document from a source location to one or more remote locations, such as by electronic mail, and more particularly, to such a method and apparatus which interfaces a printer or other display device disposed at the remote location with the document generating source irrespective of the operating characteristics and/or manufacturer of the source and display device.

Documents such as letters, reports, memoranda, legal papers, and the like, often must be delivered quickly from an originator thereof to one or more recipients at remote locations. A messenger service may be employed to hand-deliver original documents within a matter of hours; but such messenger service typically requires twelve hours or more to transport an original document over any substantial distance, such as from one major city to another. Alternatively, the text of a document, or the graphical information thereon, may be electronically transmitted from a local site to a remote site by means of facsimile transmission. However, the delivered document generally is of inferior quality and, if to be included in a formal presentation, the facsimile-received document generally must be re-typed. The aforementioned difficulties in messenger service and facsimile transmission of documents is compounded if a single document is to be transmitted to several locations.

Recently, the use of word processor systems and specially programmed computer systems for generating, storing and printing documents has been enthusiastically adopted. In these systems, digital data signals representing text may be stored on a suitable storage medium, such as a magnetic disk, from which the text subsequently may be played back and printed several times. Several manufacturers now manufacture and sell word processor and computer systems for this purpose. Some of these systems offer optional features by which a document which originates at one site may be transmitted and printed at a remote site, provided that the equipment at both sites are the same or are at least manufactured by the same manufacturer. Typically, such word processor or computer systems are provided with a so-called telecommunications output terminal to which suitable transmission and reception equipment are connected in order to transmit and receive data files associated with respective documents. In particular, an entire "document file" which normally is produced when generating a document at a word processor, is transmitted from the local site, or source, to the remote site whereat the document file is received, stored (as on a magnetic disk) and then used to print out the generated document.

A significant drawback of the aforementioned telecommunications technique for transmitting document files from one location to another is the general requirement that the display device or printer at the remote location be fully compatible with the document generating equipment. Typically, the apparatus at the remote location must be from the very same manufacturer as the apparatus at the originating location. Unfortunately, as often happens, the equipment purchased for use at one office location, such as the aforementioned remote location, may differ from the equipment purchased for use at another office location, i. e. the originating location. Consequently, interoffice telecommunication of documents often is not easily accomplished.

Although the problem of printing a document on one of various different types of print mechanisms has been recognized, as in the IBM Technical Disclosure Bulletin by Hays et al., Volume 522, No. 1 (June 1979, page 269), which describes the use of a printer adapter, this Technical Disclosure Bulletin apparently requires that the printer and document generator operate in accordance with the same format. That is, the entire document file is transmitted to and utilized by the adapter. However, there is no suggestion in this Technical Disclosure Bulletin of locating the printer at a remote site and the text generator at a local site.

Although some word processor and computer systems can be utilized with printers and display devices furnished by other manufacturers, suitable interfacing therebetween is necessary for interaction between the text generating equipment and the printing or display equipment. In some instances, signals might be returned from the printer mechanism to the text generator for proper operation of both devices. However, in view of the large numbers and variety of word processors and computer systems, the requisite document transmission interfacing between any one of such systems and any one of the various printers and display devices with which those systems can be used would result in an almost impossible task to attain universal compatibility.

The present invention proceeds on the recognition that, rather than transmitting a complete document file from a text generator to a printer, all that is needed to achieve printing at a remote location is the transmission of printer commands. It has been found that, although there are a large variety of word processor and computer systems, most printers that are usable therewith require the same general printer commands in order to operate satisfactorily. At the present time, many word processor and computer systems are provided with printer output terminals whereat only information necessary to control the printer, such as the printer commands, are provided but the remainder of the document file is not. For example, word processor/printer interfaces and computer/printer interfaces may be of the RS232 specification or other specifications such as RS232-C, Centronics Parallel, Qume 13-bit parallel, Diablo 12-bit parallel, Current Loop, and IEEE 488. As is described in greater detail below, the printer commands provided at the printer output terminal at a local site are utilized by the present invention to drive most commercial printers, such as those provided with printwheels, at a remote site.

OBJECTS OF THE INVENTION

Therefore, it is an object of the present invention to provide a method and apparatus for electronically transmitting a document from a text generator to a remote printer, notwithstanding the fact that the printer may not necessarily be compatible with the text generator.

Another object of this invention is to provide a method and apparatus for electronically transmitting, distributing and receiving a document originated on a word processor or computer system.

An additional object of this invention is to print, at a remote location, a line-by-line copy of an original document that has been produced by a document generator.

A further object of this invention is to provide a method and apparatus for generating a document at a local site and then electronically transmit that document to one or more predetermined remote locations, at desired times, for display at those remote locations by authorized personnel.

Yet another object of this invention is to provide a method and apparatus for printing or displaying on one word processor or computer system a document that originated on a dissimilar word processor or computer system.

A still further object of this invention is to transmit, via a standard telephone communication link, the text data originated at one site to a display device at a remote site.

An additional object of this invention is to provide a method and apparatus for the unattended transmission and reception of text data generated at one site and displayed or printed at another site.

It is still another object of this invention to provide a method and apparatus for receiving and storing the text data of several documents and then printing or otherwise displaying those documents as desired.

A further object of this invention is to transmit and receive documents electronically and to selectively display to the operators at the transmitting and receiving sites the identities of those documents which have been transmitted and received as well as status indications thereof, such as which documents were transmitted, which were received and which were printed.

Another object of this invention is to provide a microprocessor-controlled text communicator which, when connected to the printer output of a text generator, serves to convert the printer commands from that text generator to a common format and, when connected to a display device, such as a printer, serves to convert the common format of a received document to display control signals, such as printer control commands, whereby a line-by-line copy of the originated document is printed remotely.

A further object of this invention is to provide a method and apparatus for transmitting text data to character and position information which serves to identify the respective characters and their horizontal and vertical positions on each page of a document presented by that text data.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for transmitting from a source location to a remote location a document in the form of text data. The text data is provided at the printer output of a text generating source that normally is connected to a printer, and the text data is converted to character and position data representing the characters and their horizontal and vertical positions normally printed on each page of the generated document. The character and position data is transmitted, preferably via a telephone communication link, to the remote location whereat the character and position data is re-converted to display commands for driving a display device at that remote location to display an accurate line-by-line copy of the original document. Preferably, the character and position data are transmitted in data-compressed form; and the remote location may or may not be attended by an operator.

In accordance with one aspect of this invention, the document represented by the character and position data may be electronically transmitted to one or more remote locations, and the identities of those remote locations to which the document is to be transmitted are generated at the source location. Additionally, document identifying data, which serves to identify the title or code number of the document, the name of the originator and other data, such as an access or a security code to designate those authorized personnel who can examine the document, is generated at the source location. This document identifying data is stored at both the source and remote locations and is helpful in ascertaining whether the document has been transmitted and/or received satisfactorily at the designated remote locations. In the event of an incomplete transmission, or if a failure condition prevents the received document from being displayed or printed (e. g. a power failure at the remote location), the document is suitably identified to be re-transmitted subsequently.

As another aspect of this invention, a distribution center is provided to receive the character and position data and also the document identifying data, and then re-transmit this data to the designated remote locations. Preferably, the character and position data of each transmitted document is stored for a minimum period of time at the distribution center so as to be re-transmitted to those remote locations which have been unable to display or print the originally transmitted document, as when a failure condition arises at such remote locations.

In accordance with one feature of this invention, the storage capacity for the character and position data and also for the document identifying data at the source location and at the remote location is fixed; and an indication of whether the actual storage capacity is sufficient to store a complete document is provided.

Another feature of this invention is to provide a non-volatile memory at the source location, the distribution center and the remote location to store the document identifying data. In the event of a failure condition, such as a power failure, the document identifying data stored in the nonvolatile memory can be read out to apprise the respective operators at the source location, the distribution center and the remote location, of those documents which have not been completely transmitted or received and thus require re-transmission.

A further aspect of this invention is to provide a method and means for deleting the character and position data as well as the document identifying data from the memory device at, for example, the remote location after the document which is identified by the stored document identifying data has been printed or otherwise displayed. Similarly, this data may be deleted from the storage device at the source location after the document has been transmitted and successfully received.

As a further aspect of this invention, the document generated at the source location may be comprised of plural pages; and the end of each page is identified such that the total number of pages comprising the document may be displayed at both the source location and at the remote location. An indication of the number of pages comprising the document may be included in the document identifying data that is stored at both the source and remote locations. An operator at the remote location may select only certain ones of the pages of the received character and position data to be printed or otherwise displayed. The document identifying data also may include display control data, such as print identifying data, whereby the print type or font and the page size of the document to be printed at the remote location are specified. In the event that the document merely is displayed on a suitable display screen at the remote location, the display control data serves to establish the display format.

As one feature, the apparatus of this invention is interconnected between the printer output terminal of a word processor or computer system and the printer normally utilized by that word processor or computer system. The apparatus also is coupled to a telephone line and selectively operates in one of three modes: (1) to supply the printer command signals normally provided by the word processor or computer system to the local printer; (2) to convert those printer command signals to a common format comprised of character and position data and transmit the common format signals to a remote location for remote printing of the document; and (3) to receive common format signals representing a document from a remote location for printing at the local printer. Each of the aforementioned operating modes may be selected by an operator; and when operating in the receiving mode, the apparatus need not be attended by the operator. Hence, incoming documents will be stored automatically and in the order of reception, and such stored documents will be printed automatically in the same order in which they were received. When operating in the transmit mode, the apparatus interacts with the word processor or computer system so as to simulate the printer normally connected thereto. Thus, if the local printer normally returns signals to the word processor or computer system in response to printer commands, the apparatus likewise returns similar signals.

In accordance with the aforementioned feature, the common format in which the text data is transmitted and received by the apparatus is substantially independent of the formats of the printers used at the local and remote sites and of the format of the printer commands generated by the word processor or computer system.

BRIEF DESCRIPTION OF THE DRAWINGS

The following detailed description, given by way of example, and not intended to limit the present invention solely to the described embodiment, will best be understood in conjunction with the accompanying drawings in which:

FIG. 1 is a block diagram of an electronic document communication system (i. e. an electronic mail system) in accordance with the present invention:

FIG. 2 is a block diagram of the apparatus used in accordance with the present invention to electronically transmit and receive documents;

DETAILED DESCRIPTION OF A PREFERRED EMBODIMENT

Figures 3A, 3B:
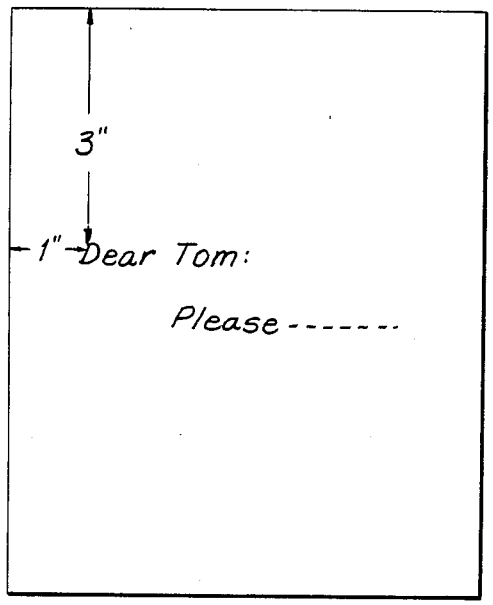
FIGS. 3A and 3B are diagrammatic representations of the format used by the present invention to represent a page of text.

Referring now to the drawings, and in particular to FIG. 1, there is illustrated an overall block diagram of an electronic document communication system in accordance with the present invention. The document communication system, sometimes referred to as an electronic mail system, is adapted to transmit (or mail) electronically a document from one location provided with the communicating apparatus described below to another location that is similarly provided. As diagrammatically represented in FIG. 1, such a document can be transmitted from, for example, location A to any one of locations B, C or D, either directly or via a distribution center 16. Preferably, the communication link between location A and any other location, or between location A and distribution center 16 is a public data network (PDN) of a type commonly used to transmit data between remote locations. Alternatively, a conventional telephone channel, as may be provided by any public telephone utility, can be used as the communication link.

Location A is provided with a text source or generator 10a, a printer or display device 12a and communication apparatus 14a, referred to sometimes herein as a communicator. Text source 10a is adapted to generate a document formed of text data, as may be generated by a word processor, a computer system, a document scanner, or the like. Alternatively, text source 10a may be adapted to generate graphic data which, for the purpose of the present description, also is referred to as a document. For convenience, and in order to simplify the present explanation, text source 10a is referred to generally herein as a word processor and may be of the type manufactured and sold by, for example, the International Business Machines Corporation, Wang Laboratories, Xerox Corporation, Lanier Business Products or any other manufacturer of contemporary word processing equipment. Although referred to as a word processor, it will be appreciated that text source 10a may be constituted by any of the other aforementioned document generators.

As is conventional, text source, or word processor 10a, is adapted to be connected to a suitable display device, such as a CRT display screen, and also to a printer, such as printer 12a. To this end, word processor 10a is provided with a printer output terminal to which printer 12a normally is connected. Although a complete document file normally is produced by the word processor, the printer output terminal thereof is supplied merely with printer commands to identify a particular character to be printed, the escapement following or preceding the printing of a character, the return of the print element to its "home" position and the number of lines or inches to be indexed by the print medium (e. g. paper) upon which the document normally is printed.

One type of print element that has been used satisfactorily with most document printers is a printwheel having individual, radially extending elements, sometimes referred to as "petals", the printwheel being rotated in response to the print command signals in order to position a desired element or petal at the print location, whereupon that element or petal is impacted against the print receiving medium to print the selected character. As is desirable, conventional printers are provided with different printwheels having, for example, different fonts or different characters thereon. The particular printwheel which is selected by the operator may be identified by a suitable message on the display device of the word processor, or by the printer commands, or by operator-actuation of a keypad included with communicator 14, described below. Other conventional printers, such as dot-matrix printers, may be used.

Word processor 10a also is provided with a memory for temporarily storing the digital text data which constitutes the document generated by the operator, a magnetic storage device, such as a magnetic disk, to store the text data for a prolonged period of time, and a keyboard by which the document is created. Such elements are, of course, conventional and, therefore, in the interest of brevity, are not further described herein. Suffice it to say that, when utilizing the present invention, the word processor and its elements are operated in a manner that is substantially identical to the manner in which the word processor normally is operated in order to create and print a document on printer 12a.

Location B similarly is provided with a text source 10b and a printer 12b, as is location D which is provided with a text source 10d and a printer 12d. Thus, each of locations A, B and D is adapted to generate or create a document via the word processor or text source 10 and to print that document on printer 12.

Location C differs from locations A, B and D in that a text source 10 is not provided. However, location C is provided with a printer 12c and, thus, is adapted to print a document that originates at another location, such as location A, B or D.

Referring again to location A, it is seen that communicator 14a is coupled to word processor 10a and to printer 12a. In locations B and D, communicators 14b and 14d are coupled to word processors 10b and 10d and also to printers 12b and 12d, respectively. In location C, communicator 14c is coupled to printer 12c. At those locations whereat the communicator is coupled to the word processor, it will be understood that electrical connection therebetween is effected at the printer output of the word processor. That is, the output terminal which normally is connected to printer 12 is, in the present invention, connected to communicator 14. Thus, the communicator is supplied with the printer commands which normally are supplied directly to the printer. It is recognized that, although word processors are manufactured by a variety of manufacturers, each utilizing its own individual protocol that is generally incompatible with word processors manufactured by others, the printer output terminals of most of these word processors are supplied with printer commands via only a relatively few printer interfaces, such as RS232 and others mentioned above. Whereas the transmission of documents created by word processors heretofore has required the transmission of an entire document file, the present invention proceeds by utilizing merely the printer commands via a printer interface (e.g. RS232 interface), thus obviating the need to interpret the entire document file.

As will be described below, communicator 14 includes an interface that is coupled to the printer output terminal of word processor 10 and is adapted to interact with the word processor in the same manner as a printer would interact therewith if the printer had been connected to the printer output terminal. Thus, communicator 14 simulates the operation of the printer so as to return appropriate signals to the word processor just as a conventional printer.

Communicator 14 functions to convert printer command data derived from the printer output terminal of word processor 10 to a common format. As will be described below, this common format is constituted by character and position data, the character data being representative of the particular characters on a page of the document created by the word processor, and the position data being representative of the vertical and horizontal positions on that page of such characters. The converted text data, that is, the character and position data which constitutes the created document, is transmitted by the communicator over a telephone communication link either to any one of locations B, C or D or to distribution center 16. As an example, a direct telephone communication link 19 is illustrated as extending between locations A and B. It will be understood that telephone link 19 may include a telephone central office as well as various relay stations, and may be constituted by a telephone cable, an optical fiber, a microwave link, and other conventional communication paths normally provided in a typical telephone link. It will be further understood that telephone link 19 may extend from one city to another, or from one site to another in the same city, or from one office to another in the same building structure. Hence, telephone link 19 may include or may be formed entirely of a private branch telephone exchange (PBX).

As will be described, communicator 14 is adapted to operate in a selected one of several modes, including a transmission mode for transmitting a document in the form of character and position data from one location to another, a reception mode for receiving a document in the form of character and position data that was originated at another location and converting that character and position data to printer commands whereby the received document is printed on printer 12, and a "pass through" mode in which the communicator assumes a standby or quiescent condition such that the printer commands normally provided at the printer output terminal of word processor 10 merely "pass through" the communicator to printer 12 without modification. In one embodiment, the mode of operation of communicator 14 is manually selected by an operator. In accordance with another embodiment, the transmission or pass through mode is selected automatically in accordance with the operation of the word processor, as will be described. In accordance with a still further embodiment, communicator 14 normally assumes its reception mode unless word processor 10 is operated, whereupon the communicator assumes either its pass through or its transmission mode, depending upon the data supplied thereto by the word processor. The communicator may alternate between its transmission and reception modes in multiplexed fashion to permit a document to be received from a location while preparing to send (or actually to send) a document to that location.

When operating in its reception mode, the character and position data supplied to the communicator normally is stored in a suitable memory, such as a random access memory (RAM), and subsequently is converted to conventional printer commands for operating printer 12. In its reception mode, communicator 14 may operate in an attended or unattended mode. In the attended mode of operation, an operator establishes communication with a transmitting communicator and, once such communication is established, as by a conventional telephone line, one or more documents constituted by character and position data are received. After the documents are received, the operator may print a desired one of those documents, or a desired one or more pages of a selected multi-page document. As will be described, communicator 14 may be provided with a suitable display to apprise the operator of the identities of those documents which have been received and the number of pages of each such document. Utilizing this display in conjunction with a manually operable keyboard, referred to as a keypad, the operator may select a desired document for printing. Preferably, communicator 14 is provided with a display and a keypad separate and apart from the usual keyboard and display screen of the word processor. As an alternative embodiment, however, the very same keyboard and display of the word processor may be used to display and select the documents which have been received by and are stored in communicator 14.

As will be described below, a document normally is formed of text data which represents alphanumeric characters or graphic symbols, as well as text identifying data which identifies the document by, for example, its title, the name of the originator or sending station, and various other information which may be useful for accounting purposes, such as the originator's account number, the branch or department in which the originator is employed and, optionally, an access or security code which is useful in designating all personnel who are authorized to display or read the document. The information included in the text identifying data, which may be thought of as job file information, is stored and displayed to permit an operator of communicator 14 to learn of those documents which had been received and which are available for printing. The text identifying data serves other useful functions, as will be described below.

As shown in FIG. 1, location A may communicate with distribution center 16 via a conventional communication link, such as a telephone channel 18a. The purpose of the distribution center is to receive one or more documents from location A as well as from locations B and D, and to re-transmit each received document to those remote locations which the originator has designated for reception. For example, the operator at location A may designate locations C and D to receive the document originated at location A. In one mode of operation, a direct communication link may be established between locations A and C and the document then may be transmitted to location C. Thereafter, a direct communication link may be established between locations A and D and the document then transmitted to location D. However, it is possible that at the time the document has been originated at location A, the time zone in which locations C and D are disposed are quite inconvenient for document reception. For example, the document may be originated in New York City at 9:00 A.M., and the sites of locations C and D may be Honolulu and Tokyo whereat the times are 4:00 A.M. and 11:00 P.M., respectively. By transmitting the document from location A to distribution center 16, the times at which the document is re-transmitted to locations C and D may be preset to any desired or convenient time during which operators will be in attendance at such remote locations. Alternatively, in order to take advantage of discounted telephone tariffs, the preset times at which the document is to be re-transmitted may be such as to assure such discounts, particularly since communicators 14c and 14d may be operated in the aforementioned unattended mode.

Distribution center 16 may be thought of as a storage and clearing house for the various documents created by the illustrated locations for transmission to the other locations at desired times. Another advantage of utilizing the distribution center resides in the feature of storing for a period of time each document transmitted thereto from an originating location. Even after such document is re-transmitted to a selected designation, the text data and the text identifying data of that document remain stored at the distribution center. Hence, if the text data of a transmitted document is "lost" before the designated recipient has had an opportunity to display it or before it can be printed at the designated remote location, the recipient can request re-transmission of that document from the distribution center. This may be explained as follows: A document received by communicator 14 is normally stored therein until it has been selected for printing. However, in the event of a failure condition at the receiving communicator, for example, in the event of a power failure, the stored document may be "lost" or distorted before it has been displayed or printed. This possible situation arises because, as mentioned above, the document normally is stored initially in a random access memory which, as is conventional, is a volatile memory. As is known, information stored in a volatile memory generally will be lost in the event of a power failure. Even if so-called "back-up batteries" are utilized in an attempt to preserve the stored text data, the document still may be lost due to battery failure or other unforeseen events. It is, therefore, desirable to retain the document electronically at distribution center 16 such that it can be re-transmitted to a designated remote location if necessary.

Accordingly, distribution center 16 may include a communicator 14 for receiving the text data and text identifying data which constitute a transmitted document, a suitable nonvolatile storage device, such as a magnetic disk, tape, or the like, for storing such documents for a period of time, and another communicator for re-transmitting a received document to a designated remote location. Although the same communicator may serve dual functions whereby it may be used to receive a document and to transmit that document at a later time, it is expected that there will be sufficient communication between distribution center 16 and various locations to suggest the use of plural communicators at the distribution center for efficient reception and re-transmission of documents. In FIG. 1, distribution center 16 is seen to communicate with locations A-D via telephone communication links 18a, 18b, 18c and 18d, respectively.

When operating with distribution center 16, a location, such as location A, may establish a telephone communication link with the distribution center for the purpose of transmitting the text data and text identifying data of a document thereto. In this regard, manual or automatic telephone communication apparatus may be included in or connected to communicator 14a to establish such a telephone communication link. Once this link is established, a document which originates at location A is transmitted to the distribution center, preferably in data-compressed form. That is, to minimize the length of time during which the telephone communication link must be maintained and, thus, to reduce the cost of document transmission, data compression techniques are used to transmit a document from communicator 14a to distribution center 16. It will be appreciated that such data compression techniques also are utilized to transmit the document over direct telephone link 19 from location A to location B or to any other location. As an example, the Markov and Hoffman coding/decoding technique may be used for data compression.

As mentioned above, communicator 14a includes a storage device, such as a random access memory or other suitable memory which, typically, comprises a volatile memory. Advantageously, the storage capacity of such memory is sufficient to store a document formed of several pages of text and, moreover, to store several such documents. As a numerical example, the storage capacity of communicator 14a may be sufficient to store up to 200 pages of text data. All of the documents stored in communicator 14a may be transmitted, one-at-a-time, successively, to distribution center 16 for storage thereat and for re-transmission from the distribution center to designated remote locations. Once the document or documents have been fully transmitted to the distribution center, the existing telephone communication link then may be utilized to re-transmit a document from the distribution center to communicator 14a in the event that such a document has been stored at the distribution center. That is, if a document destined for location A has, in fact, been stored at the distribution center, that document may be re-transmitted over the same telephone communication link that was provided when the operator of communicator 14a established communication with the distribution center rather than wait for a later time which the originator of that document may have selected for transmission. Similarly, if a document is to be transmitted directly from communicator 14a to communicator 14b via the direct telephone communication link 19, a document destined to be returned to communicator 14a may be transmitted over the very same communication channel after the first document is received.

As mentioned above, the creation of a document for transmission is carried out in the same manner as used normally by the word processor operator to create and print that document locally. Thus, the keyboard of the word processor is operated conventionally to create the desired document. Of course, rather than having that created document printed locally, such as at printer 12a, the primary purpose of the present invention is to transmit the text data constituting that document to a remote location for printing thereat irrespective of the particular equipment used at the source, or originating location, and that used at the remote location. Typically, after the operator creates the desired document but before it is supplied to and stored in communicator 14a, the text identifying data therefor is produced. (If desired, the text identifying data may be created first.) This text identifying data, also referred to herein as document identifying data and as job file data, contains information which, as discussed above, identifies the document by, for example, its title or by a document identifying number, and also identifies the name, account number and/or organization of the originating party. This data also identifies the remote locations to which the document is to be transmitted and, by utilizing the access code mentioned above, also may identify those who are authorized to examine or print the document. Still further, this document identifying data also includes display characteristics of that document, such as the type of print, or font which is to be used for printing the document and the size of the print medium, or paper, upon which the document is to be printed.

The document identifying data further includes an indication of the number of pages which constitute the document and also the relative priority at which the document is to be transmitted to the various designated remote locations. Priority level identifying data identifies the order of dispatch of the document to respective remote locations. As a numerical example, the times of transmission of the document from the distribution center to the designated remote locations may be ordered in accordance with priority levels "1", "2" and "3", wherein the priority level "1" means that a document will be re-transmitted to the designated remote location within thirty minutes after receipt of the document by the distribution center, the priority level "2" means that the document will be re-transmitted within four hours after receipt by the distribution center, and the priority level "3" means that the document will be re-transmitted within eight hours of reception.

Typically, the document identifying data is produced by the word processor operator in the same manner as any other document (e.g. a letter, a memorandum, a report, or the like). That is, the keyboard of the word processor is operated to create the document identifying data. It is expected that, when transferring a document from the word processor to communicator 14 whereat the document is stored prior to transmission, the first page of that document is assumed to be the document identifying data. The purpose of this document identifying data is to assure the proper routing of the transmitted document, and the document identifying data may be referred to as a "routing page". An example of a typical routing page is as follows:

Document Name: Financial Report
Sender Name: John Doe
Priority: 2
Account Number: 888566445
Security Code: 104796
Comment: Send me your views immediately.

DESTINATIONS

ABC Div. New York/Sales/2
VP Finance/ /1
Market Consultants/Tech/2

In addition to the information set out above, the document identifying data, or routing page, may include a designation of the type of print by which the document is to be printed at the remote location. This type of print, or font, may be included as an additional "comment".

In the example of the routing page above, three separate destinations for the document are designated. Each destination designation is comprised of three portions: the identity of the recipient, which may include an identifying number by which distribution center 16 is enabled to establish communication with the designated recipient; an optional identification of any group or department or individual located at the designated destination for whom the document is intended; and the priority by which the document is dispatched to the designated destination. It is seen that the respective priority of dispatch to a particular destination may differ from the designated priority identified in the third line of the routing document. In one embodiment, the specified priority for a respective destination is controlling, and the document will be re-transmitted to that destination at the specified priority irrespective of the priority listed in the third line of the routing document. However, in the absence of any specified priority at which the document is to be re-transmitted to a particular destination, the priority listed in the third line of the routing page will be adopted.

In creating the routing page, it is possible that the operator inadvertently may omit certain necessary information relating to the document, or other errors may be made while creating that page. As will be described below, when the routing page is transferred to communicator 14, such omissions and errors are sensed and an error indication is displayed to apprise the operator thereof. Such omissions or errors thus can be corrected. If no omissions or errors are sensed in the routing document, then the document identifying data which comprises the routing document is transmitted, along with the document itself, to the distribution center for non-volatile storage and subsequent re-transmission to those destinations which are designated in the routing document.

Although a routing document may not be necessary when re-transmission by distribution center 16 is not utilized, as when communicator 14a establishes direct communication with communicator 14b via communication channel 19, the creation of the routing document nevertheless would be helpful for record keeping or archive purposes. For example, if communicator 14a transmits several documents to communicator 14b, and if a power failure occurs at location B before all of those documents can be printed, the text data of those documents which may be lost due to the power failure can be re-transmitted by communicator 14a if the identities of the lost documents are ascertained. In the absence of a routing page or document identifying data, it would be difficult, if not impossible, to determine which document or documents should be re-transmitted. Preferably, the routing page is stored in a non-volatile memory at both the transmitting and the receiving locations.

When documents are received by a communicator, they are stored temporarily until transmission is completed, whereupon the stored text data may be printed or otherwise displayed. As mentioned above, it is preferable that the routing page, which normally precedes the text data, include information to designate the type of print in which the document is to be printed. For example, if the printer mechanism is of the type which includes a printwheel, the routing page may include the identity of the particular printwheel which is to be used. Some printers, prior to carrying out printer commands, provide a signal indicating the type of printwheel included therein. If the actual printwheel differs from the designated printwheel, a suitable warning indication may be provided to enable the operator at the remote location to exchange printwheels.

As discussed previously, if the communicator at the remote location is disposed in its attended mode of operation, the operator thereat may select a desired one of the received and stored documents for printing. Alternatively, if the communicator is disposed in its unattended mode of operation, those documents which are stored are printed, following reception thereof, in the same order in which they were received. However, in both the attended and unattended modes, the document identifying data (e.g. the routing page) for each received document as well as the text data thereof will remain stored in the communicator until deleted by the operator, or until a maximum number of documents (e.g. thirty documents) has been received. By operating the keypad of the communicator, the operator may effectively delete from the communicator memory all received documents which have been printed or, alternatively, the operator may delete only selected ones of those printed documents.

Preferably, the document identifying data that is stored in a receiving communicator includes status information to represent whether that document has been printed. When a document is received, the status information associated therewith indicates that the received document has not yet been printed. However, once that document has been printed, the status information automatically is changed over to indicate same. Thus, to be apprised of those documents which have been received and printed or those documents which have been received but not yet printed, the keypad of the communicator may be operated such that the display of the communicator displays the identities of such documents. Furthermore, in the event of a failure condition, such as a power failure, the communicator display is activated to apprise the operator of that failure condition. The keypad then may be operated to apprise the operator of those documents which had not yet been printed and, thus, which may be lost due to the power failure. This enables the operator to request re-transmission of such lost documents.

The status information provided by the document identifying data that is received by a remote communicator also may be provided at the transmitting communicator. However, this status information indicates whether a document stored at the transmitting communicator has been fully transmitted. Such status information is useful in the event that a document is not completely transmitted because of, for example, a power failure or other fault condition which may occur prior to the completion of transmission. Operation of the keypad at the transmitting communicator allows the operator thereat to be apprised of those documents which had been stored at the transmitting communicator but had not been fully transmitted. Such lost, or incompletely transmitted, documents may be transferred once again from word processor 10 to communicator 14 for transmission to a designated remote location or to a distribution center 16.

The status information included in the document identifying data stored at the transmitting communicator also may indicate whether that document has been re-transmitted from distribution center 16 to the designated destinations. In this regard, an acknowledgement message may be transmitted from the distribution center back to the transmitting communicator when such re-transmission has occurred. This acknowledgement message may be returned automatically in the event that the transmitting communicator subsequently is disposed in its unattended mode of operation, or may be returned manually by an operator or a supervisor at the distribution center.

The Communicator

Referring now to FIG. 2, there is illustrated a block diagram of one embodiment of communicator 14. It will be appreciated that this communicator may be provided at a source location at which a document is created and transmitted to one or more remote locations, at a remote location for receiving a transmitted document, or at the distribution center for receiving and re-transmitting documents from a source location to designated destinations. Communicator 14 illustratively is comprised of a storage device for storing text data and document identifying data, the storage device including a block memory 26 for storing the text data and a document queue memory 28 for storing the document identifying data or job file. Since communicator 14 is adapted to be connected to a word processor and to a printer, it also is comprised of a word processor interface 22, a word processor to communicator control section 24, a print control section 38 and a printer interface 40. Still further, communicator 14 is adapted to be connected to a telephone communication channel to transmit and receive documents over conventional telephone channels. For convenience, the device that is connected to the other end of the communication channel is referred to as a "host", and the communicator also includes a communicator to host control section 30, a host to communicator control section 36, modem output circuitry 32 (sometimes referred to as the output modem) and modem input circuitry 34 (sometimes referred to as the input modem). Additionally, communicator 14 includes a keypad, as mentioned above, which may be comprised of individual keys or pushbuttons by which various operations of the communicator are selected and controlled, the operation of these keys or pushbuttons (not shown) being sensed by a keypad control section 42. Moreover, a non-volatile memory 44 is provided for the purpose of displaying selected portions of the document identifying data stored in document queue memory 28, and a display 46 is provided to display such data. As will be described, display 46 may be formed of a multi-character LCD display, such as a two-line, forty character display which is controlled, in part, by keypad control section 42 and by a display control section 48, the latter also being included in communicator 14.

As diagrammatically illustrated, the printer output terminal of word processor 10 is coupled to word processor interface 22 of communicator 14. The word processor interface is adapted to return to the word processor those signals which are expected when an actual printer is connected to the printer output terminal. Thus, one purpose of word processor interface 22 is to simulate a printer such that the word processor operates in substantially the same manner as it would if a printer is connected thereto. The word processor interface also includes a microprocessor such as a Zilog Model Z-80, and suitable memory devices, such that the various printer commands supplied at the printer output terminal of word processor 10 are identified. As mentioned above, the printer commands at the printer output terminal generally are non-identical from one word processor to another. Accordingly, the word processor interface serves to interpret such printer commands in accordance with the particular word processor to which it is connected, and to generate data signals representative thereof. These data signals thus indicate the particular character or control command generated by the word processor, such as the character "a", "b", or the like, a "space", a "return", or the like. In addition, the amount of escapement for the particular character also is included in the printer commands, and this too is interpreted and represented by the data signals produced by interface 22. Still further, an end-of-page code generated by the word processor is detected, as are the "stop" code and various "header" and "footer" codes normally provided at the word processor output. Hence, interface 22 provides compatibility with word processor 10 irrespective of the particular characteristics of that word processor as incorporated therein by its manufacturer. It is appreciated that the microprocessor subroutine by which interface 22 is made compatible with word processor 10 is dependent upon the particular word processor to which communicator 14 is intended to be connected.

The output of word processor interface 22 is coupled to word processor to communicator control section 24. Although a direct connection is illustrated in FIG. 2, it will be appreciated that data and control buses may be provided among the illustrated functional blocks, and the data signals produced by interface 22 may be applied to the data bus for receipt and utilization by word processor to communicator control section 24. The purpose of control section 24 is to convert the printer command data signals produced by interface 22 to a common format, described below, and to supply to document queue memory 28 the document identifying data associated with the document that is represented by the data signals. In FIG. 2, solid lines schematically represent the flow of text data, that is, the data which constitutes the document per se, and broken lines schematically represent the flow of document identifying data and control signals.

Word processor to communicator control section 24 is adapted to convert the printer command data signals to character and position information representing each character to be printed on a page of the document and the vertical and horizontal positions of that character. Thus, the "X" and "Y" graphical coordinates of each character to be printed are designated. Such character and position information represents the text data originating at word processor 10 and, it is this, character and position data which may be thought of as the document generated by the word processor.

By identifying the position on the page of each character to be printed, the end of a page of characters may be detected, even in the absence of an "end-of-page" code. Based upon the detected vertical position of a character, word processor to communicator control section 24 may generate an end-of-page code on its own to signify or indicate the end of a page of the document. Alternatively, when operating word processor 10 in its normal mode, the number of lines on each page of a document normally is preset. This information usually is provided at the printer output terminal of word processor 10 and will be detected by word processor interface 22. Hence, by knowing the number of lines to be printed on each page, and by counting the number of lines of characters as they are converted to the common format (comprised of character and position information), an end-of-page code may be generated by control section 24 once the preset number of lines has been counted.

As schematically illustrated in FIG. 2, the text data produced by word processor to communicator control section 24, that is, the common format comprised of the character and position information of the document, is supplied by control section 24 to block memory 26 for storage therein. Additionally, document queue memory 28 may be comprised of an input section in which are stored the document identifying data, or job files, associated with documents which are received by the communicator, an output section in which are stored document identifying data supplied from word processor to communicator control section 24, and a print section in which are stored the document identifying data associated with documents to be printed by printer 12 at the site of the communicator. Although separate sections of document queue memory 28 are illustrated, it will be appreciated that the document queue memory may be formed of a single random access memory (RAM), a storage disk or other storage medium, for storing document identifying data having appended thereto a particular flag or designator to represent whether that document identifying data is to be considered stored in the input section, the output section or the print section. Control section 24 thus controls the flow of text data from interface 22 to block memory 26 and also controls the flow of document identifying data to the output section of document queue memory 28. The subroutines carried out by word processor to communicator control section 24 to achieve the foregoing are described in greater detail below with respect to the flow charts shown in FIGS. 4, 5 and 6.

As will also be described with respect to these flow charts, display control section 48 is responsive to the operation of word processor to communicator control section 24 to control display 46 so as to provide an operator with indications of the storage of text data and document identifying data.

Block memory 26 is adapted to store, in the aforementioned common format, one or more multi-page documents originated at word processor 10 and supplied thereto as character and position data by word processor to communicator control section 24. As each document is supplied to and stored in the block memory, control thereover is effected, in part, by control section 24, as will be described below. Moreover, one or more multi-page documents which originate at a remote location are supplied to block memory 26 by way of input modem 34 and host to communicator control section 36. Likewise, the storage of such incoming documents is controlled by control section 36. Still further, the documents stored in the block memory are selectively read out therefrom and transmitted to a remote location under the control of communicator to host control section 30. In this manner, documents which originate at word processor 10 may be transmitted to a remote location or to a distribution center (as shown in FIG. 1), and these documents are referred to as outgoing documents. Finally, those incoming documents which are stored in block memory 26 may be read out therefrom under the control of print control section 38, these read out documents being supplied to printer 12 by way of printer interface 40 for printing at the local site. Alternatively, such read out documents may be displayed on other display devices, such as a CRT display screen. It will be appreciated that the various control sections 24, 30, 36 and 38 are microprocessor implemented, and the various routines that are carried out by such control sections may be executed by a single microprocessor or, alternatively, such routines may be executed by plural shared microprocessors or even by individual microprocessors. Preferably, a single microprocessor having individual subroutines is used to implement these control sections. One example of a suitable microprocessor is the Zilog Model Z-80.

When communicator 14 is disposed in its document transmission mode, the character and position data stored in block memory 26 is read out therefrom by communicator to host control section 30 and supplied to output modem 32 for transmission via a telephone communication link to the remote location. Preferably, this document, in the form of character and position data, is data-compressed, as mentioned above, in order to reduce the time required for transmission and, thus, to reduce the telephone-connect cost to the remote location. Although a modem 32 is illustrated, it will be recognized that other suitable devices may be used to interface communicator 14 with a communication channel, such as a radio communication link, an optical communication link, or the like. As will be described below, in addition to the text data comprising the document, control section 30 also serves to control the reading out of document identifying data for transmission to the remote location then in communication with communicator 14.

As schematically illustrated in FIG. 2, communicator to host control section 30 is coupled to the output section of document queue memory 28. As mentioned above, the document queue memory stores at least portions of the document identifying data, such as the identities of those documents stored in block memory 26 which are destined for outgoing transmission, the number of pages included in such documents, print type identifying data (e.g. the printwheel and size of the paper to be used for printing the document) and status information indicating whether that document has been transmitted to the designated remote location. As will be described, this document identifying data also is stored in non-volatile memory 44 so as to be retained even in the event of a power failure at communication 14. Such document identifying data is selectively displayed on display 46, such as a two-line, eighty character LCD display, under the control of display control section 48 which, in turn, is operated by word processor to communicator control 24 when a document created by word processor 10 is stored in block memory 26, and by communicator to host control section 30 when that created document is to be transmitted to a remote location. The word "host", as used herein, is intended to refer generically to a remote location to which a document is transmitted for printing or from which a document is received, or to the distribution center which, as mentioned above, functions to re-transmit a document to one or more designated locations.

Host to communicator control section 36 is adapted to receive incoming documents, via input modem 34, in the common format comprised of character and position data representative of the text data of the incoming document. Such an incoming document, which may consist of one or more pages, is supplied to and stored in block memory 26. In addition, the document identifying data associated with that incoming document is supplied to and stored in the input section of document queue memory 28. As illustrated schematically, the contents of the input section of the document queue memory also are stored in non-volatile memory 44 for the purpose of retaining the document identifying data in the event of a failure condition (e.g. a power failure) at the communicator. The contents of the non-volatile memory are selectively applied to display 46, as will be described, so as to apprise an operator of those documents which, for example, have been received but which may have been lost due to the failure condition. That is, those received documents which have not yet been printed or displayed may be identified, and re-transmission of those documents to the communicator may be requested. The host to communicator control section interacts with display control section 48 to control display 46.

It is recalled that communicator 14, when disposed to receive an incoming document, may operate in an attended or unattended mode. The desired mode is manually selected, as by the operation of the keypad of the communicator, and host to communicator control section 36 operates in accordance with the selected mode.

For example, if unattended operation is desired, host to communicator control section 36 operates in conjunction with input modem 34 to complete a telephone communication link automatically (e.g. to "answer" an incoming telephone call) and to verify that the communication link is established with a similar communicator to receive incoming documents.

Display control section 48, when cooperating with host to communicator control section 36, operates display 46 to display the mode of operation which is selected (e.g. attended or unattended), and also cooperates with print control section 38 to display the manner in which received documents are printed. For example, in either attended or unattended modes, each document that is received from a host device may be stored in block memory 26 to await subsequent printing when desired by the operator of communicator 14. Alternatively, the operator of the communicator may select, by operation of the keypad, so-called continuous printing, whereby the document identifying data associated with each received document is stored in the input section of document queue memory 28 and is transferred to the print section thereof under the control of keypad control section 42 to command the automatic printing of that document once it is fully received.

Print control section 38 is responsive to document identifying data stored in the print section of document queue memory 28 to effect a reading out of that document from block memory 26 to printer interface 40 for printing on printer 12. When a document stored in the block memory is fully printed, the status information included in the document identifying data of that document, which is stored in the print section of the document queue memory, is updated to indicate the printing of that document. Thus, those documents which have been received and printed, as well as those documents which have been received but not yet printed, are noted in the document queue memory, and the identities of such documents may be displayed accordingly on display 46. Thus, in the event of a failure condition, the operator of communicator 14 may be apprised of those documents which have been received but not yet printed and, hence, may request re-transmission from the host of those documents which were lost before printing.

Print control section 38 cooperates with display control section 48 such that display 46 provides indications of those documents which are in the process of being printed as well as those documents which are awaiting printing. Print control section 38 is adapted to convert the common format of the text data stored in block memory 26 to printer command data signals similar to those data signals produced by word processor interface 22. Printer interface 40 responds to these printer command data signals to supply to printer 12 the particular printer commands (e.g. character selection, escapement, line indexing, and the like) in the protocol needed to drive the particular printer which is used. It will be appreciated that, rather than providing a printer for the display of incoming documents, other display devices, such as a CRT display, may be used. Printer interface 40 then would be compatible with that display.

As mentioned above, communicator 14 may operate in its "pass through" mode. In this mode of operation, the printer commands normally provided at the output of word processor 10 are supplied directly to printer 12 without modification by the word processor interface or the word processor to communicator control section of the communicator. While operating in the pass through mode, documents which had been created at word processor 10 previously and now are stored in block memory 26 may be supplied to communicator to host control section 30 for transmission via output modem 32 to a remote host. Thus, the communicator permits concurrent printing at the local site of documents in the process of being generated by word processor 10 as well as the transmission to a remote location of documents which had been generated previously. Also, the pass through mode permits the reception of documents from a remote location while printing a document that is being generated by word processor 10.

The manner in which the functional blocks which comprise communicator 14 operate now will be described with reference to examples of particular modes of operation of the communicator.

Document Transmission

Let it be assumed that a three-page document (e.g. a letter) has been created at word processor 10 and is stored in the usual memory of that word processor. Let it be further assumed that the operator of communicator 14 wishes to transmit that document to several remote locations by way of distribution center 16 (FIG. 1). For convenience, the three pages of the documents are identified as pages 1, 2 and 3, respectively. Prior to supplying that document from word processor 10 to communicator 14, an initial display on display 46 is provided in response to the actuation of a start key, referred to as the "home" key. By actuating the "home" key, the quiescent or inactive status of the communicator is displayed. Typically, this display indicates that local printer 12 is idle, that block memory 26 is idle (i.e. that data is not in the process of being supplied thereto), that no documents have been received or stored in the block and that no documents are present in the block memory for transmission to the distribution center. Upon actuation of another key of the keypad, the amount of memory capacity in block memory 26 is displayed, the selected document reception mode is displayed (e.g. attended or unattended), the status of the communication link is displayed (e.g. active or idle), and the selected mode in which documents are to be printed when received (e.g. continuous printing or manual printing) also is displayed. Preferably, the displayed storage capacity of block memory 26 is in the form of the number of pages of a document that may be stored. As an example, block memory 26 may be capable of storing a maximum of 200 pages of documents, and the capacity available to store documents, whether incoming or outgoing, in terms of pages is displayed.

The next step in transmitting the document which had been created at word processor 10 is to generate the routing page described above. This routing page, like the document itself, is created by operating the keyboard of the word processor. If the word processor is provided with a display screen (as is conventional), this routing page is displayed thereon as it is generated. In one embodiment, it is important that the identity of the document, the identity of the originator and the identity of at least one destination are entered. Preferably, a suitable code is generated, as by the operator, when the routing page is created, to distinguish this page from the pages of the document itself.

After completing the routing page, but before supplying this page and the document itself to communicator 14, the keypad is operated to identify the characteristics with which the document is to be printed at the remote location. Thus, the identity of the printwheel to be used and the size of the print medium are entered by suitable operation of the keypad. Display 46, under the control of display control section 48, which cooperates with word processor to communicator control section 24, displays the selected printing characteristics. Preferably, preset "prompts" are displayed by display 46, requiring merely the entry of the printer characteristics to complete the display. For example, the prompt of "printwheel" may be displayed to request identification of the type of printwheel to be used (which may be identified by a numeral, such as printwheel 1, printwheel 2, etc.), and a prompt representing the size of the page on which the document is to be printed may be displayed, this prompt merely requiring a numerical entry of the page size.

After the printer characteristics have been entered, the next display provided by display 46 indicates that block memory 26 now is ready to receive and store the routing page which had been created. Since this routing page had been created on word processor 10, the word processor keyboard now is operated in the usual manner to effect what otherwise would be the "printing" of that routing page on printer 12. For example, the "print" key of the word processor is operated. Now, since document transmission had been selected, the text data or print command data included in the routing page is supplied to word processor interface 22, is converted to the aforementioned common format by word processor to communicator control section 24 and is stored in block memory 26. Display 46 now indicates that the block memory is "active" and is storing the routing page. Further details of the manner in which this routing page is stored is described below with respect to the flow chart shown in FIG. 4.

Prior to supplying block memory 26 with the text data of the document itself, the routing page which had been created on word processor 10 is supplied thereto. Of course, the printer commands which characterize this routing page are converted by word processor to communicator control section 24 to the common format comprised of character and position data for storage in the block memory. As the routing page is stored in block memory 26, the information included in that routing page is sensed for the occurrence of any errors therein. For example, if the identity of the document or the originator is omitted, or if an improperly formed destination is listed, an error is sensed and displayed. If additional optional information is erroneously entered, such as an account number with too many or too few digits, an access code that is not proper, or other information which is invalid or not permitted, this error condition is sensed and displayed. While the routing page is being stored, display 46 is controlled by display control section 48 in cooperation with the word processor to communicator control section to indicate that the block memory is "active" and is storing the routing page. Additionally, since the routing page may itself be formed of a plurality of pages of information (e.g. if several destinations are designated thereon), the particular page of the routing page which is being stored also is displayed.

If an error is sensed in the routing page, an identification of that routing page is stored in the input section of document queue memory 28, even though the routing page is created locally at word processor 10. The purpose of storing an identification of the routing page in the input section of the document queue memory is to enable that identification to be transferred to the print section thereof, whereupon the text data of the routing page stored in the block memory is supplied to print control section 38 for printing (or otherwise displaying) the routing page at printer 12 with indications of the sensed errors. This permits the operator to correct those errors in the routing page. However, if no errors are sensed in the routing page stored in block memory 26, then the identification of that routing page merely is stored in the output section of the document queue memory for subsequent transmission of the routing page, or at least its job file data, to the host.

After the routing page has been stored in block memory 26 and its job file data has been stored in the output section of document queue memory 28, the text data of the document itself is supplied from word processor 10 via word processor interface 22 to block memory 26. As mentioned above, the data signals representing this text data are supplied by the word processor interface to word processor to communicator control section 24 whereat the text data is converted to the common format constituted by character and position data. In one embodiment, it is this character and position data that is stored in the block memory. Prior to receiving this text data and after the routing page has been stored successfully in block memory 26, display 46 is controlled by display control section 48 in cooperation with word processor to communicator control section 24 to indicate that the block memory now is ready to store the document. Word processor 10 is operated in the manner normally used to print a document; resulting in the printer commands, or text data, being supplied to and stored in block memory 26. As the document is being stored, display 46 is controlled to indicate that the block memory is in its active condition and is in the process of storing a document.

Usually, end-of-page indications are provided in the printer commands from word processor 10. Alternatively, since the vertical position of each character to be printed on each page is known, an end-of-page indication may be generated when that vertical position reaches what is determined to be the bottom of the page of text. In either event, an end-of-page indication is used by display control section 48 to control display 46 so as to indicate the number of the page then being stored in block memory 26.

After the last page of the document has been stored, word processor to communicator control section 24 awaits the receipt of further text data from word processor 10. If additional text data is not received within a predetermined period of time, such as three seconds, an indication thereof is provided and display control section 48 controls display 46 to indicate that block memory 26 has paused and is awaiting further data. Additional text data now may be stored in block memory 26. However, if no further text is to be created and stored in the block memory, an "end" key, or equivalent, on the keypad of communicator 14 is operated, whereupon the document identifying data which had been stored in the output section of document queue memory 28 now causes the identified document to be read out from the block memory to communicator to host control section 30 for transmission to the host. Thereafter, another document may be stored in block memory 26, including the appropriate routing page for that document; and the manner in which this new document and its routing page are created and stored is substantially identical to that described above.

As an alternative to the "end" key, the operator may actuate an "abort" key for the purpose of deleting the document which had just been stored in the block memory. This deletion is achieved by deleting the document identifying data in the output section of document queue memory 28, thereby removing the link between the data stored in the block memory and the identity of that data stored in the document queue memory. Another document now may be created and/or stored in block memory 26 in the manner discussed above.

In the aforementioned description, one or more documents are transmitted from block memory 26 to a remote host by way of a telephone communication link. This link may be established by the operator after the document has been stored in the block memory, by initiating a telephone call to the remote host in the conventional manner. Alternatively, such a telephone call can be initiated automatically, as by an automatic dialer or the like once the "end" key is actuated. Still further, the telephone call may be initiated at a predetermined time, as by triggering a timer in response to the actuation of the "end" key.

As mentioned above, block memory 26 may have a storage capacity on the order of about 200 pages. Hence, a document stored in the block memory may remain therein for future re-transmission in the event that a previous transmission is not successful. The output section of document queue memory 28 stores the identification of those documents which had been supplied to block memory 26 by word processor 10 for transmission to a host. Typically, such document identification may include data which identifies the title of the document or a particular identifying number of that document and, additionally, may include the name of the originator, and other identifying data such as a billing account number, an access or security code and codes representing designated destinations for that document. This data, it is recalled, also is included in the routing page that is stored in the block memory and transmitted to designated destinations. In addition to being stored in the output section of document queue memory 28, this document identifying data, or portions thereof, is stored in non-volatile memory 44 to insure that the identification of documents which may have been lost (e.g. due to power failure or the like) prior to successful reception by the host may be identified and, if necessary, stored once again in the block memory. As mentioned above, in addition to storing the document identifying data of documents to be transmitted, non-volatile memory 44 also stores document identifying data of received documents, that is, the document identifying data stored in the input section of the document queue memory. Suitable flags or designators may be used with or appended to the data stored in non-volatile memory 44 so as to indicate whether that data is associated with incoming or outgoing documents.

In one embodiment, the storage capacity of non-volatile memory 44 is limited to the document identifying data of thirty incoming documents and thirty outgoing documents. Such document identifying data also includes status information which indicates whether an outgoing document has, in fact, been transmitted to the host (e. g. whether that document has been "mailed"), and whether that document has been received by the host (e. g. whether the host has returned an acknowledgement). Similarly, the document identifying data of incoming, or received, documents includes status information to indicate whether those documents have been printed, or otherwise displayed, at printer 12. A change in the status information may be made in the document identifying data stored in document queue memory 28, whereupon this status information is transferred to the non-volatile memory.

After the document identifying data of thirty outgoing documents has been stored in non-volatile memory 44, the oldest of that document identifying data is replaced with the document identifying data of the next outgoing document, thereby effectively deleting a record of that oldest outgoing document. This has the effect of deleting that oldest outgoing document from block memory 26.

The document identifying data stored in non-volatile memory 44 may be reviewed by actuating a suitable key (for example, an "out" key) on the communicator keypad. The identification of each such document then is displayed by display 46, and that document identifying data may be deleted from the non-volatile memory (which results in the deletion of that document from block memory 26) by operating a "delete" key, or the like. Thus, selected documents may be deleted from the block memory so as to increase the available storage capacity thereof. Also, if a document has been stored in the block memory and is awaiting transmission, it may be deleted, in the manner described above, if the operator decides not to transmit that document.

In some circumstances, the operator at communicator 14 may want to confirm that a transmitted document actually has been received by, for example, distribution center 16. The communicator keypad is provided with a "report" (or equivalent) key which, when actuated, transmits a request for the return to communicator 14 of an acknowledgement of the receipt of the document. Such an acknowledgement may take the form of a delivery report which returns to the communicator information including the identity of the document which has been received at the distribution center, the identity of the originator of that document, the destinations designated by communicator 14 for transmission of that document and the time at which the distribution center received that document. This delivery report is received by the communicator as any other document and is stored in block memory 26 for subsequent printout at printer 12. The delivery report is accompanied by document identifying data which first is stored in the input section of document queue memory 28 and then is transferred to the print section for the purpose of selecting the delivery report for print out from the block memory. That is, the delivery report is acted on and interpreted as any other received document.

Reception of a Document

Let it now be assumed that communicator 14 is disposed at a remote location for the purpose of receiving one or more documents. As an example, the document which is transmitted in the manner discussed above will be received by communicator 14 for printing at the remote location. Input modem 34 of the receiving communicator is coupled to a telephone communication link or any other conventional communication channel and is adapted to receive and decompress a data-compressed document which is transmitted thereto in the common format constituted by character and position data. Typically, the communication link is established automatically. If desired, a "hand shaking" operation may be employed to verify an authorized incoming telephone call from another communicator.

Before a document actually is transmitted to communicator 14, an indication of the number of pages included in that document is received. If sufficient storage space is available in block memory 26 to store all of those pages, a "ready" indication is returned to the transmitting communicator, and document transmission ensues.

It is recalled that the first page of the transmitted document is the routing page comprised of document identifying data. This routing page is sufficiently identified by host to communicator control section 36 and the document identifying data is stored in the input section of document queue memory 28. In one embodiment, the routing page also may be stored in block memory 26 for subsequent printing on the printer apparatus provided at this site. In addition to being stored in the input section of the document queue memory, the document identifying data is stored in non-volatile memory 44 for subsequent display by display 46.

If the communicator keypad had been operated to dispose the communicator in its unattended mode of operation, keypad control section 42 operates to transfer the received document identifying data from the input section of the document queue memory to the print section thereof. Print control section 38 is responsive to this document identifying data to read out the text data of the document once it is stored in block memory 26 to supply that text data to printer interface 40. The print control section operates to convert the common format of the text data from character and position data to printer commands; and the printer interface supplies those printer commands to printer 12 in a form that is fully compatible with the printer. Thus, in the unattended mode of operation, documents which are received and stored in block memory 26 are read out therefrom and printed. If several documents are supplied to communicator 14 while the telephone communication link is established, these documents are stored in block memory 26, and the document identifying data associated with those documents are stored in document queue memory 28, in the same order in which they are received.

If the receiving communicator is disposed in its attended mode of operation, the text data of incoming documents are, of course, stored in block memory 26, and the document identifying data associated with each such document is stored in the input section of document queue memory 28 until print-out is requested by the operator. The status of those documents which are stored in the block memory but have not yet been printed is indicated as a portion of the document identifying data stored in the input section of the document queue memory. Such status information also is indicated in the document identifying data stored in non-volatile memory 44. Thus, in the event of a failure condition, such as a power failure, before the documents stored in block memory 26 may be read out and printed, an indication of those "lost" documents which have been received but not yet printed remains in the non-volatile memory. The operator, via actuation of the communicator keyboard, may review those documents which were lost and then request re-transmission of the lost documents.

Those documents which are stored in the block memory may be printed selectively as desired by the operator. This is achieved by suitable actuation of the communicator keypad, as by actuating a "mail" key, which, in combination with display control section 48, controls display 46 to display the identity of those documents which are stored in the block memory and are awaiting printing. The identities of those documents may be displayed, one-at-a-time, as by title or identifying number thereof. When the operator wishes to print a document so displayed, the keypad may be operated accordingly. For example, the "mail" key may be actuated once again or some other key, such as a "start" or "execute" key may be operated. In this manner, the identities of those documents stored in block memory 26 may be ascertained by the operator, and desired ones of those documents may be selected for printing in any order.

If an access or security code is included in the received document identifying data, then the document associated with that access or security code may not be printed or otherwise displayed unless such printing or displaying is authorized. For example, when reviewing the identities of stored documents, as in the manner described above, display 46 also may indicate the necessity for the operator to enter, by the communicator keypad, the authorization code of that operator or location. If the received access code compares positively with the entered access or authorization code (e. g. if they are the same), then the document stored in block memory 26 may be printed or otherwise displayed.

The foregoing authorization requirement also may be utilized even if the communicator is disposed in its unattended mode of operation. As mentioned above, in this unattended mode, all received documents are printed in the order in which they are received. However, if a received document is accompanied by an access or security code, and if the location at which communicator 14 is disposed is not authorized to print or display that document, then this received document will not be printed until an operator manually enters the proper authorization code to permit such printing.

After a received document has been printed, the status information included in the document identifying data stored in non-volatile memory 44 is updated by, for example, print control section 38, to indicate that the received document has been printed. If desired, the document identifying data of that printed document then may be deleted from the non-volatile memory. For example, the operator may actuate a "delete" key of the communicator keypad. Upon actuation of this key, display control section 48 controls display 46 to display, one-at-a-time, the identities of those documents which have been printed. When the identity of a particular document to be deleted is displayed, the actuation of, for example, an "execute" key results in clearing that document identifying data from the non-volatile memory and, thus, that document is effectively cleared or deleted from block memory 26. If a document identified by display 46 is not to be deleted, the "execute" key need not be actuated, and display 46 may be controlled (as by actuating a "next" key or equivalent) to display the identity of another document which has been printed.

The keypad may be operated such that the identities of all documents which have been printed are to be deleted. In this mode of operation, display 46 does not display the identity of each such document. Rather, the identities of all printed documents are simply deleted from the non-volatile memory.

As a further alternative operation thereof, the keypad may be actuated such that display 46 displays the identities of all documents which have been received (provided the document identifying data remains stored in non-volatile memory 44) regardless of whether those documents have been printed. The printed/unprinted status of such documents also is displayed. As a precaution, however, the identity of a document which has been received and stored in the block memory but has not yet been printed cannot be deleted from the non-volatile memory until that document actually is printed.

The storage capacity of the input section of document queue memory 28, and also the storage capacity of non-volatile memory 44, is finite. In one embodiment, if the input section of the document queue memory or the non-volatile memory is filled such that sufficient storage capacity is not available for further document identifying data, the transmission of a document to communicator 14 is inhibited until document identifying data is deleted. In another embodiment, the identities of those documents which have been printed are deleted automatically so as to increase available storage capacity to store new incoming document identifying data.

Common Format

As mentioned above, the text data which is transmitted from one communicator to another is in the common format constituted by character and position data. An understanding of this character and position data will be derived from the following explanation in conjunction with FIGS. 3A and 3B.

FIG. 3A is a diagrammatic representation of the letter that is generated by, for example, word processor 10. It is assumed that the document, when printed at the remote location, will be printed on desired letterhead. In any event, the letter commences with the usual salutation, for example, "Dear Tom:". The first letter "D" commences approximately three inches from the top border of the paper on which the letter is to be printed and one inch from the left border of that paper. Assuming uniform escapement, each letter occupies approximately the same amount of horizontal space which, for example, may be approximately twelve units, wherein a "unit" is an arbitrary measure. It is further assumed that spaces also occupy twelve units.

It is apparent that the vertical and horizontal position of the letter "D" is known. The number of vertical units, or line advances from the top border of the paper is included in the printer commands received from the printer output of the word processor and, similarly, the number of horizontal units that the letter "D" occupies from the left edge of the paper also is known. Hence, the offset from the top margin of the paper to the first line of the letter, in terms of line advancements, is specified, and this offset, referred to as the "first line offset", remains fixed for all characters included in this first line. In addition, the vertical position on the page of this first line likewise is known from the "first line offset", and this vertical position thus may be specified. Still further, in the example shown in FIG. 3A, the next line of the letter, that is, the body of the letter, commences after skipping one or more lines from the first line of that letter. Thus, the offset from the first line to the next line, referred to as the "offset to next line" is equal to the number of lines which must be advanced from the first line (i. e. the line reading "Dear Tom:") to the beginning of the next line (i. e. the line reading "Please . . . ").

The data constituting the "first line offset", the "offset to next line" and the "vertical position" of the first line are included in segments, and the number of segments which are needed to characterize a complete line of text is referred to as a data block. FIG. 3B schematically illustrates two data blocks which define all of the characters included in the first two lines of the letter shown in FIG. 3A as well as the vertical and horizontal positions on the page of each character. The "first line offset" segment 52 thus establishes the position on the page of the first line and is suitably identified such that this segment is readily distinguished from the remaining segments of the ensuing data blocks.

The "offset to next line" segment 54 identifies the number of vertical line advances necessary to reach the next-following line of text. Although not shown in FIG. 3A, it is possible that, in some documents, the characters included in the next line may include superscripts which, of course, are closer to the preceding line than the main text. In that case, the "offset to next line" segment represents the offset to the line of superscripts. That is, the superscripts constitute the "next line". Similarly, if a subscript is present, the "offset to next line" segment represents the offset to the line of subscripts.

Following the "offset to next line" segment 54 and the "vertical position" segment 56, the latter defining the absolute position on the page of the first line, the segments which include character identifying data and horizontal position data of those characters are provided. As shown in FIG. 3B, each of these segments is comprised of two portions: a character portion which identifies the particular character in the line, and a horizontal position portion which identifies the spacing of that character from the preceding character on the line. The horizontal position portion contains digital data representing the number of units that this character is spaced from the preceding character. In the present example, since the letter "D" is the first character to be printed on this first line, the horizontal position portion of segment 58 represents the number of units that the letter "D" is spaced from the left edge of the paper. In the illustrated example, the letter "D" is spaced sixty units from the left edge of the paper; and segment 58 is formed of character data "D" and horizontal position data "H60", thereby representing the character, its position on this horizontal line (i. e. it is spaced sixty units from the left edge) and its vertical position (i. e. it is in the line whose vertical position is represented by segments 52 and 56).

Segment 60 includes the character and position data representing the next character in this line, that is, the character "e", which is spaced twelve units from the preceding character "D". Thus, segment 60 identifies the character "e" and its horizontal position "H12" in this line. The next-following segments 62 and 64 identify character "a", which is spaced twelve units from the preceding character "e", and character "r", which is spaced twelve units from the preceding character "a". Thus, segments 58, 60, 62 and 64 identify the characters which constitute the word "Dear", and the horizontal positions of each character in this first line.

The next segment 66 identifies the character "T" which is spaced twenty-four units from the preceding character "r". Thus, it is not necessary to provide a segment representing the space between the end of the word "Dear" and the beginning of the word "Tom". Rather, segment 66 identifies the horizontal position of the letter "T", which is seen to be spaced twice as far from the letter "r" as normal spacing because of the blank space which separates "Dear" from "Tom". Segments 68, 70 and 72 identify the remaining characters in this first line of text and the horizontal position of each character, relative to the preceding adjacent character, in this first line.

Thus, it is seen that the data block representing the text included in line 1 of the letter shown in FIG. 3A identifies each character, the horizontal position of that character in the line, and the vertical position of that line. The characters and their horizontal and vertical positions thus are identified. It will be appreciated that standard codes may be used to identify the characters represented in the character portion of each segment, such as ASCII Code, and a similar ASCII Code may be used to represent the numerical values of the horizontal units included in the position portion of each segment. Thus, uppercase and lowercase letters, numerals, punctuation marks and other standard symbols normally used in constituting text data are represented in the character portion of each segment.

After the data block comprising the first line of the text is produced, the data block comprised of the next line of text is generated. FIG. 3B illustrates only a portion of this next line which commences with segment 74 that identifies the offset from this second line to the next-following line. The "offset to next line" segment 74 is similar to the aforementioned segment 54, and is followed by the "vertical position" segment 76 which identifies the absolute vertical position of this next line on the paper. Thereafter, segments 78, 80, 82 and so on follow to represent each character and its horizontal position in this second line. Thus, the character portion of segment 78 identifies the letter "P", and the position portion of segment 78 identifies the horizontal location of the letter "P" as being spaced from the left edge of the paper by 120 units. From FIG. 3A, it is seen that the letter "P" is, in fact, indented from the margin defined by the letter "D" in the preceding line; and it is assumed that this indentation is equal to 120 units from the left edge of the paper.

Segments 80 and 82 represent the characters "1" and "e", each spaced 12 units from the preceding adjacent letters. Further segments (not shown) are provided to complete this second line of text.

The data block representing the last line of text on a page will indicate in the "offset to next line" segment thereof the number of line advances to the bottom of the page. In one embodiment, a data block representing the bottom of page itself is included, with the "vertical position" segment indicating the vertical position of the bottom of the page. This bottom-of-page indication may be used to signify the end-of-page. Alternatively, rather than providing a data block to identify the bottom of the page of paper, the data block containing the last line of text may provide a suitable indication in the "offset to next line" segment indicative of the fact that this data block is the last line of text. This indication may represent the end-of-page.

It is appreciated that the horizontal position that one character is spaced from an adjacent character may be uniform, as represented by the data blocks of FIG. 3B, or proportional spaced characters may be used to print the document. If the characters are to be printed with a proportional spaced printer, the position portion of the character segments identifies the number of units that a respective character should be printed from the leading edge of the preceding character. As an example, if the word "time" is to be printed on a proportional-spaced printer, the position portion of the segment representing the letter "m" may indicate that this letter is spaced approximately eight units from the preceding letter "i", and the character portion of the segment representing the letter "e" may indicate that this letter is spaced approximately sixteen units from the preceding letter "m".

A typical page may include a maximum of eighty characters on a given line. In one embodiment, the number of segments included in a data block is variable, and each line may be represented by a respective data block having a maximum of eighty character segments therein. Thus, data blocks are of variable length and those lines of text having a greater number of characters therein will, of course, be represented by longer data blocks. In an alternative embodiment, a data block may be of fixed length and, thus, each data block will be expected to contain segments of more than one line. In such an embodiment, it is anticipated that a portion of the segments constituting one line will be included in one data block and the remaining segments representing the characters of that line will be included in the next-following data block.

The character and position information which constitute the common format and which are included in the data blocks shown in FIG. 3B may be produced by word processor to communicator control section 24 of the communicator. As an example, control section 24 may include a temporary memory, or buffer, in which the data signals of a respective page of text, as produced by word processor interface 22, are stored. The data signals then may be converted on a line-by-line basis to the format shown in FIG. 3B. Once converted, these data blocks may be temporarily stored in what is referred to as a "page buffer" prior to being supplied to block memory 26.

It will be understood that the common format represented by the data blocks shown in FIG. 3B is used to represent both text data and the document identifying data discussed above. Although not shown in FIG. 3B, an additional segment may be provided, either preceding or following segment 52, representing the total number of segments in all of the data blocks which are used to represent one page of the document. Still another segment may be provided to represent the characteristics by which the document is to be printed. For example, this additional segment (or segments) may indicate the size of the paper on which the document is to be printed and the type of print, or font, that is to be used for printing that document.

Storing the Document Identifying Data

Figure 4:
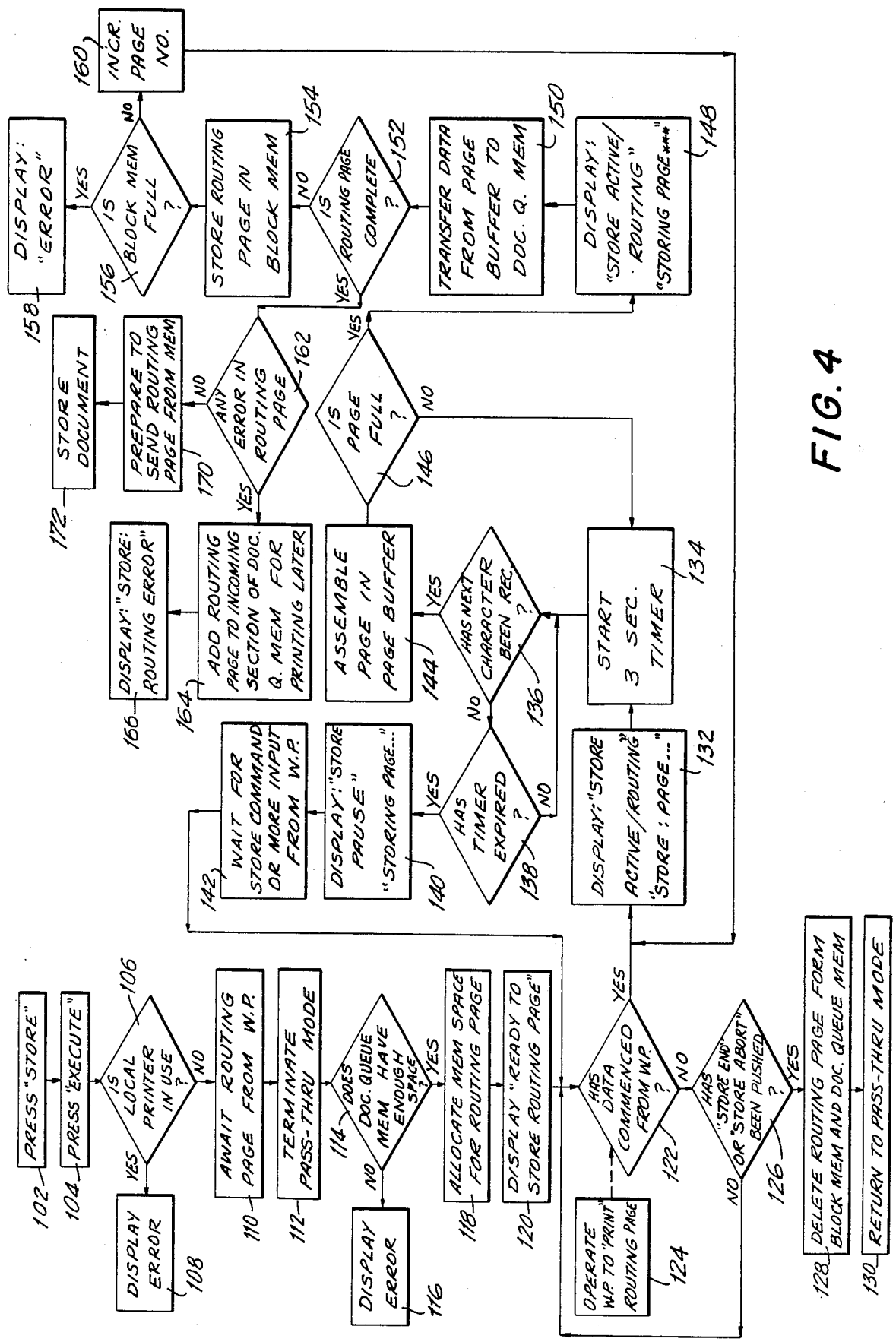
FIG. 4 is a flow chart of one routine in accordance with the present invention whereby document identifying data is assembled for transmission.

The subroutine carried out by word processor to communicator control section 24 (FIG. 2) by which the document identifying data (or routing page) created by word processor 10 is stored in block memory 26 is illustrated by the flow chart schematically shown in FIG. 4. It is recalled that this document identifying data is created by the word processor to identify the document whose text is to be printed at a designated remote location, to identify the originator of that document and to identify the particular destination or destinations at which the document is to be printed. In addition to being stored in block memory 26, the document identifying data, or at least significant portions thereof, is stored in the outgoing section of document queue memory 28. As the document identifying data is received (in the aforementioned common format shown schematically in FIG. 3B), display 46 is controlled, as will now be described, to apprise the operator of the progress of this storage operation.

Word processor to communicator control section 24 senses the actuation of the "store" key of the communicator keypad, as represented by block 102 of FIG. 4, thereby preparing the control section to transfer the expected document identifying data to block memory 26. Once the control section senses the actuation of the "execute" key of the communicator keypad, as represented by block 104, the subroutine advances to inquire, at 106, if local printer 12 is in use. If this inquiry is answered in the affirmative, that is, if the communicator had been disposed in its pass-through mode and this mode is active, a suitable error is displayed, as represented by block 108. Thus, the communicator cannot be conditioned to store the document identifying data if, at the same time, word processor 10 is supplying data for printing at printer 12.

However, if inquiry 106 as to whether printer 12 currently is in use is answered in the negative, control section 24 awaits receipt of the routing page from word processor 10, the source of that routing page. This step is represented by block 110. In addition to awaiting receipt of the routing page, the pass-through mode in which communicator 14 had been disposed is terminated, as shown by block 112.

Then, inquiry is made, at 114, of whether there is sufficient capacity in the output section of document queue memory 28 to store the document identifying data. As mentioned above, the common format shown in FIG. 3B may include, as an initial segment or segments thereof, an indication of the total number of segments included in a page. Alternatively, the total number of data blocks or the total number of segments included in all of the data blocks of the page or the document may be provided. This indication is examined to determine the requisite storage requirement of the document identifying data, and this requirement may be compared to an indication of the storage space which is available in a document queue memory. If there is sufficient capacity in the document queue memory to store the document identifying data, block 114 is answered in the affirmative. However, if the storage space available in the document queue memory is not sufficient to store this document identifying data, block 114 is answered in the negative and a suitable error display is provided, as represented by block 116. Thus, the operator is apprised of the fact that the document identifying data, or routing page, cannot be stored in communicator 14 and, thus, the document which has been created at word processor 10 cannot, at this time, be stored in or transmitted by the communicator. Of course, when additional storage space is made available in document queue memory 28, the inquiry of block 114 subsequently will be answered in the affirmative.

If the document queue memory contains sufficient storage space to store the document identifying data, control section 24 advances to block 118 to allocate the requisite amount of storage space in the document queue memory for this document identifying data. Then, proceeding to block 120, display 46 is controlled to display an indication that the memory is "ready to store the routing page", as represented by block 120. Then, inquiry is made, at 122, of whether data is being received from word processor 10. It is recalled that, in order to supply the routing page data to control section 24, the "print" key normally provided at word processor 10 must be actuated. If this "print" key has not been actuated, as represented by block 124, then the inquiry of whether data has commenced is answered in the negative, and the next following inquiry, represented by block 126, of whether the operator has actuated the "store end" or "store abort" keys of the communicator keypad is made. If inquiry 126 is answered in the negative, the illustrated subroutine merely cycles until data is received from the word processor or until the operator actuates the "store end" or the "store abort" key. When either of these keys is actuated, inquiry 126 is answered in the affirmative and whatever portion of the document identifying data has been stored in document queue memory 28 is deleted therefrom. Likewise, any portion of the document identifying data that had been stored in block memory 26 also is deleted from block memory. This is indicated by block 128 in FIG. 4. Following this instruction, the subroutine advances to block 130, whereby communicator 14 returns to its pass-through mode. When in this mode, the communicator awaits the actuation of the "store" and "execute" keys to re-initiate the storage of document identifying data; or the communicator awaits the receipt of an incoming document that had been transmitted from a remote location.

Let it be assumed that inquiry 122 is answered in the affirmative, that is, let it be assumed that data has commenced from the word processor. It is recalled that this data is the document identifying data, or routing page, associated with a document that had been created on the word processor. Accordingly, control section 24 advances to block 132, whereupon display 46 indicates that the communicator memory is "active" and is in the process of storing the routing page. In addition, display 46 indicates the number of the page of the document identifying data that now is being stored. Typically, the document identifying data, or routing page, is comprised of a single page or, in some instances two pages. Accordingly, display 46 provides an indication that page 1 or page 2 is in the process of being stored.

With the receipt of each character, or segment (FIG. 3B) of the document identifying data, a timer is triggered, as represented by block 134. As a numerical example, a three second timer is initiated whenever a character, or segment, is received. After initiating this timer, inquiry is made, at 136, if another character, or segment, has been next received. If this inquiry is answered in the negative, control section 24 advances to block 138 to inquire whether the timer has timed out. If the timer has not timed out, that is, if three seconds have not passed since the previous character, or segment, was received, the inquiry of block 136 is repeated. The control section cycles through inquiries 136 and 138 until the next character, or segment, is received from the word processor or until the timer has timed out. Let it be assumed that inquiry 138 is answered in the affirmative. As shown by the flow chart of FIG. 4, once the timer has timed out, display 46 provides an indication that the data storage operation is in its "pause" condition, and the display further indicates the number of the page which is in the process of being stored, as represented by block 140. In the present example, it is assumed that a pause occurs during the storage of the first (or only) page of the document identifying data and, thus, display 46 here indicates that the storage operation has paused while in the process of storing page 1. Control section 24 then advances to block 142 whereupon the subroutine waits either for more data from word processor 10 or for the operation of the "store end" or "store abort" key on the communicator keypad. The subroutine then returns to block 122 to repeat the operation described above.

Let it be assumed that the inquiry of block 136 is answered in the affirmative. When the next character is received from the word processor, it is stored temporarily in the aforementioned page buffer so as to assemble a page of the data blocks shown in FIG. 3B. That is, the routing page is assembled in the common format schematically illustrated therein as character and position data. As each character, or segment, is stored in the page buffer, inquiry is made, at block 146, of whether a full page has been assembled. As discussed above, the end of a page is indicated either by an end-of-page character or by an indication in the "vertical position" segment of the data blocks shown in FIG. 3B that the bottom of the page has been reached. If a full page has not been assembled, the subroutine returns to block 134, and the operation discussed above is repeated. However, if a full page of the routing document has been assembled in the page buffer, that is, if inquiry 146 is answered in the affirmative, the subroutine advances to block 148 whereupon display 146 is controlled to indicate that the storage operation is active and that this first page of the routing page is in the process of being stored.

Following the instruction represented by block 148, the subroutine advances to block 150, whereupon the document identifying data is transferred from the page buffer, where the routing page had been assembled, and now is stored in the outgoing section of document queue memory 28. As the document identifying data is transferred, inquiry is made at block 152 of whether this routing page is completely stored in the document queue memory. If this inquiry is answered in the negative, the routing page itself is stored in block memory 26, as represented by block 154. As the routing page is stored in the block memory, inquiry is made, at 156, of whether the block memory is full. If this inquiry is answered in the affirmative, display 46 is controlled to provide a suitable error display, as represented by block 158. However, if the storage capacity of block memory 26 is not yet filled, then inquiry 156 is answered in the negative and, as each page of the routing page is stored in the block memory, a page counter is incremented, as represented by block 160. After the page number is incremented, as by detecting an end-of-page character, or by detecting a "vertical position" segment (FIG. 3B) which identifies the bottom of a page, the subroutine returns to block 132, whereupon display 46 continues to indicate that the storage operation is active, that the routing page is being stored and now the next page of the routing page is in the process of being stored. The subroutine then continues through the steps and instructions which are illustrated in FIG. 4 and which have been described above.

Let it be assumed that, as data is transferred from the page buffer to the document queue memory, inquiry 152 as to whether the routing page has been completed now is answered in the affirmative. That is, the end of the last page of the routing page has been detected. The subroutine then advances to inquiry 162 which seeks to determine whether an error is present in the routing page. As mentioned above, as the routing page is stored in block memory 26 and also in document queue memory 28, the information or data included in that routing page is sensed for the occurrence of any errors therein. If, for example, the identity of the document or its originator is omitted or if an improper destination is designated, an error flag is set. Preferably, the type of error which is sensed also is indicated by setting appropriate flags. Once the end of the routing page has been detected, that is, when inquiry 152 is answered in the affirmative, the presence of any error flags or error data is detected. If an error flag is sensed, inquiry 162 is answered in the affirmative. Accordingly, the subroutine advances to block 164, whereupon the document identifying data of the routing page is transferred from the outgoing section of document queue memory 28 to the incoming section thereof. It is recalled that when document identifying data is stored in the incoming section of the document queue memory, it is transferred subsequently to the print section thereof such that the text data of the identified document is read out from block memory 26 for printing at local printer 12. By transferring the document identifying data of the routing page from the outgoing section to the incoming section of the document queue memory, the routing page may be selected by the operator for printing at local printer 12 so as to identify those errors which have been made in the routing page.

After the document identifying data of the routing page has been transferred to the incoming section of the document queue memory, display 46 is controlled, as represented by block 166, to indicate the presence of an error in the routing page. The operator thus is apprised accordingly and, upon suitable operation of the communicator keypad, may effect the reading out of the routing page from block memory 26 (in which it had been stored, as represented by block 154 of this flow chart) via print control section 38 and printer interface 40 for printing at printer 12.

However, if inquiry 162 is answered in the negative, that is, after the routing page has been fully stored in the block memory and no error has been detected in the document identifying data which has been fully stored in the document queue memory, the subroutine advances to block 170 whereupon the text of the routing page is conditioned to be sent from block memory 26 to a remote location in communication with communicator 14, once the entire document that is identified by the routing page has been stored in the block memory. The subroutine then advances to block 172 to store the text data of the document that has been created on the word processor.

At this stage of the operation of the flow chart shown in FIG. 4, the routing page is stored in block memory 26 for transmission to a designated remote location and the document identifying data, that is, the job file data, represented by that routing page and which identifies and characterizes the document (e. g. the letter, report, memorandum, or the like) which is to be transmitted to the remote location is stored in the document queue memory. This identifying or job file data is stored in the outgoing section of the document queue memory and may be loaded into non-volatile memory 44 now or at any time selected by the microprocessor subroutines.

Storing the Document (Text Data)

As represented by block 172 in the flow chart of FIG. 4, once the routing page has been stored in block memory 26 and the identifying, or job file data has been stored in document queue memory 28, the text data of the document which is to be transmitted to the designated remote locations is stored in block memory 26 (in the common format shown in FIG. 3B). The subroutine carried out by control section 24 to store the text data is represented by the flow chart shown in FIG. 5.

Initially, and as represented by block 174, display 46 is controlled to indicate that block memory 26 is ready to store the text data of the document to be transmitted. As discussed in the previous section, the routing page and job file data associated with this document have been stored in block memory 26 and in document queue memory 28, respectively. The present subroutine then advances to inquire, at 176, whether data has commenced from the word processor. As represented by block 178, and as has been described above, the text data of the document to be transmitted is received from the word processor in response to the actuation of the usual "print" key thereon.

If inquiry 176 is answered in the negative, that is, if the "print" key of the word processor has not been actuated or if for some reason text data is not being received, inquiry 204 is made as to whether the "store end" key of the communicator keypad has been actuated. Normally, this key is actuated only after a complete document has been loaded into block memory 26. Thus, if inquiry 204 is answered in the affirmative, it is assumed that such a document, regardless of its length, now is stored in the block memory, as represented by block 206. The subroutine then advances to block 208 where the document identifying data stored in the outgoing section of document queue memory 28 which identifies the text data of the document stored in block memory 26 is found, and then, as represented by block 210, the document is transmitted from block memory 26 to the remote location then in communication with communicator 14.

If inquiry 204 is answered in the negative, the subroutine advances to inquiry 212 to learn whether the operator has actuated the "store abort" key of the communicator keypad. If this key is actuated, the document identifying data, or job file data, which had just been stored in the outgoing section of the document queue memory is deleted therefrom, as represented by block 214. Communicator 14 then advances to its pass through mode, as represented by block 216, and display 46 is controlled to indicate that the communicator memory is "idle". Thus, in response to the "store abort" key, whatever portion of the text data of the document has been stored in block memory 26 is deleted therefrom, and the job file data associated with this document is deleted from the document queue memory. The condition of the communicator memory is as if there had been no attempt to store this particular document.

If neither the "store end" nor the "store abort" keys are actuated, the subroutine cycles through inquiries 176, 204 and 212 until text data is received from the word processor. Upon the occurrence of this text data, inquiry 176 is answered in the affirmative. Accordingly, display 46 is controlled to indicate that the storage operation is "active" and the particular page of the document then being received is displayed. At the present time, and in accordance with the example being described herein, display 46 indicates that page 1 of the document (as opposed to the routing page) is in the process of being stored, as indicated by block 180. The subroutine then advances to block 182 whereupon the timer mentioned above is activated. After the activation of this timer, inquiry 184 is made as to whether the next character of text data has been received. If this inquiry is answered in the negative, the subroutine advances to block 186 to inquire whether the timer has timed out. If not, the subroutine continues to cycle through inquiries 184 and 186 until either the next character is received or the timer has timed out.

If the timer has timed out before the next character has been received from the word processor, the subroutine advances to block 188 whereupon display 46 is controlled to indicate that the storage operation has paused, and the display further indicates the particular page which is in the process of being stored in block memory 26. Then, the subroutine advances to block 190 which represents that the actuation of the "store end" or "store abort" key, or the reception of the next character of the text data is awaited. The subroutine thus may return to the inquiry of block 176.

Let it be assumed that, prior to the expiration of the timer, the next text data character is received from the word processor. Thus, inquiry 184 is answered in the affirmative, and the subroutine advances to block 192 whereupon the received character is stored in the page buffer to assemble a page of text. It is appreciated that the text data is stored in the page buffer in the format illustrated in FIG. 3B. As characters are assembled in the page buffer to form the page of text, inquiry 194 is made as to whether a complete page has been assembled. That is, the subroutine senses the occurrence of an end-of-page character or an indication that a "vertical position" segment (FIG. 3B) is equal to the bottom of a page. If neither occurrence is sensed, inquiry 194 is answered in the negative, and the subroutine advances to re-start the timer, as represented by block 182.

However, once a complete page has been assembled in the page buffer, inquiry 194 is answered in the affirmative and the subroutine advances to block 196, whereupon the assembled page is transferred from the page buffer to block memory 26.

Figure 5:
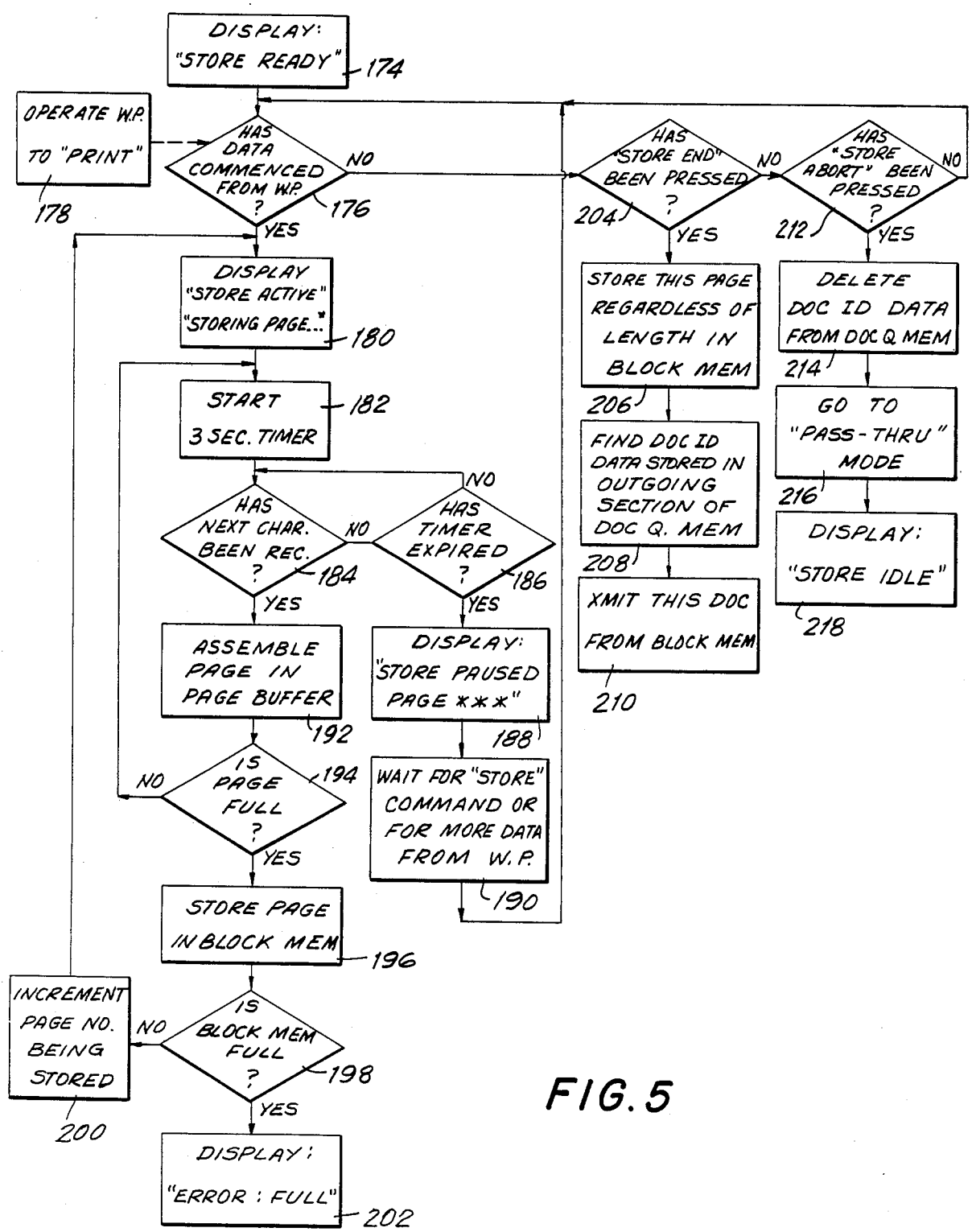
FIG. 5 is a flow chart of another routine in accordance with the present invention by which the text data of a document is assembled and stored for transmission to a remote location.
Figure 6:
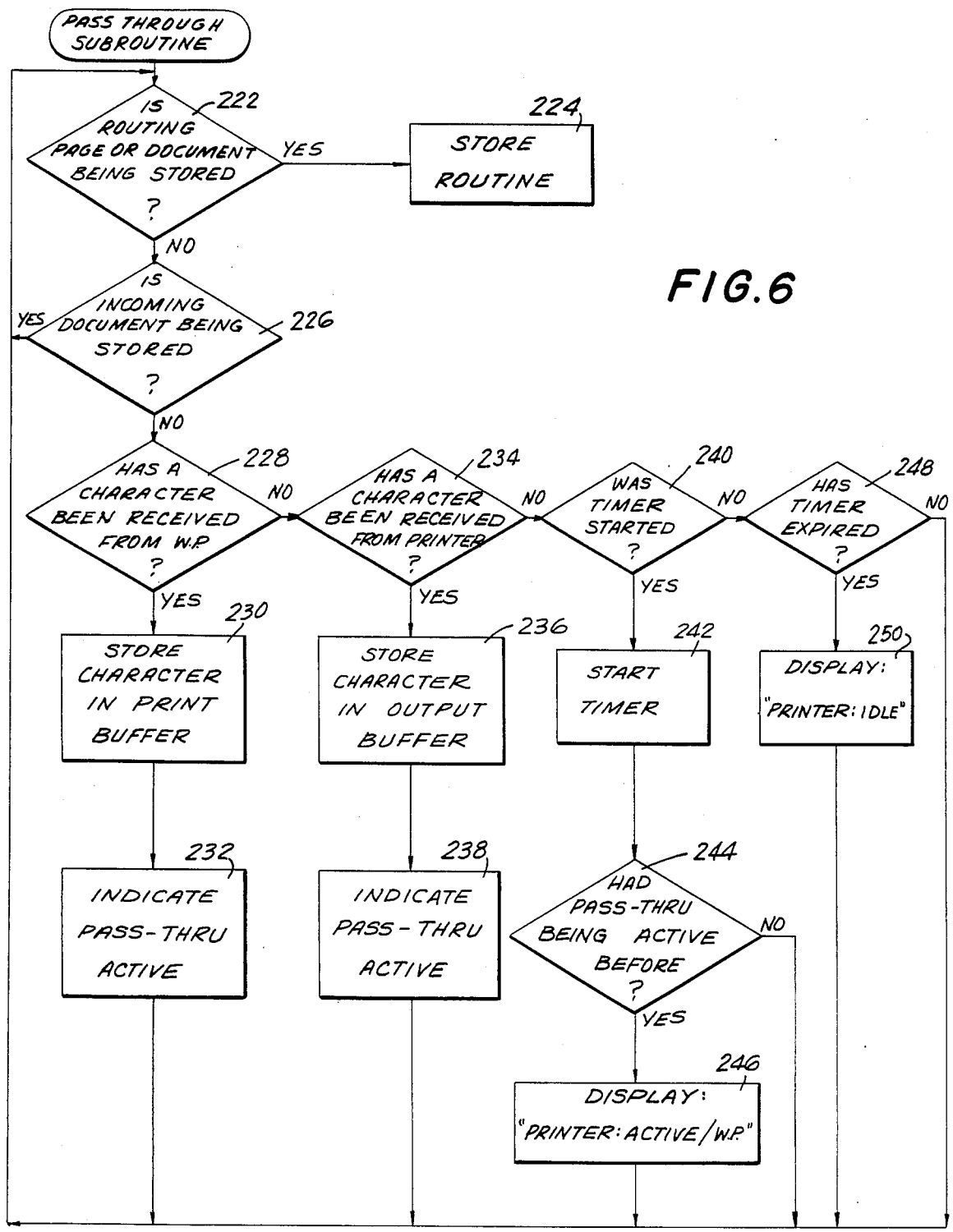
FIG. 6 is a flow chart of a further routine in accordance with the present invention whereby a mode of operation is selectively established and displayed.

After a page has been stored in the block memory, control section 24 advances to inquiry 198 to inquire whether block memory 26 is full. If the storage capacity of the block memory has been fully occupied before the storage operation has been completed, that is, before the "store end" key has been actuated, inquiry 198 is answered in the affirmative, whereupon the subroutine advances to block 202 to control display 46, whereupon a memory "full" error indication is provided. However, if additional capacity of the block memory remains, inquiry 198 is answered in the affirmative and, as illustrated in FIG. 5, the subroutine advances to block 200 to increment the number of the page then being stored. Thereupon, the subroutine returns to block 180 and the foregoing operation is repeated.

It is appreciated that a page counter is incremented until the last page of the document is stored in block memory 26. At that time, the contents of the page counter may be loaded into the job file data stored in the outgoing section of document queue memory 28.

As discussed above in conjunction with the operation represented by the flow chart shown in FIG. 5, once the operator actuates the "store end" keys, the document stored in block memory 26, as identified by the job file data stored in the outgoing section of document queue memory 28, is transmitted to a remote location or to distribution center 16. Thus, both the routing page which preceded this document and the document itself are transmitted. It is recalled that the document is transmitted in data-compressed form and in the common format represented by the data blocks shown in FIG. 3B.

Pass Through Subroutine

The "pass-through" mode that has been described above functions to permit the printer that normally is connected to the word processor to be utilized for printing the documents created by that word processor. When the pass through mode is "active", a document stored in block memory 26 may be transmitted to a remote location while an independent document created by the word processor is printed. Also, when the pass through mode is active, a document received from a remote location may be stored in the block memory while a document created by the word processor is printed. The pass through mode is controlled by a subroutine that is illustrated by the flow chart shown in FIG. 6.

Initially, inquiry is made at 222 as to whether a routing page or a document is in the process of being stored. If this inquiry is answered in the affirmative, the pass through subroutine advances to the store subroutine, represented by block 224, whereupon the routing page or document then is stored in the block memory. Alternatively, and in place of the store routine represented by block 224, if a routing page or document to be transmitted had been stored in the block memory, inquiry 222 is answered in the affirmative and a store read out subroutine is carried out to transmit the stored document to a remote location.

However, if a routing page or document is not stored, inquiry 222 is answered in the negative and the pass through subroutine advances to inquiry 226. This inquiry determines if an incoming document is in the process of being printed. If so, the subroutine returns to inquiry 222 to cycle through the loop formed of inquiries 222 and 226.

However, if an incoming document is not being printed, the pass through subroutine advances to inquiry 228 to determine if a character has been received from word processor 10. If so, the received character is stored in the print buffer, as represented by block 230, and an indication is provided that the pass through mode is active, as represented by block 232. The pass through subroutine then returns to inquiry 222.

However, if a character is not received from word processor 10, inquiry 228 is answered in the negative and inquiry 234 is made to determine if a character has been received from the printer. It is recalled that, in some word processor configurations, signals are returned to the word processor from the printer, and inquiry 234 is provided to sense if such a signal is present. If this inquiry is answered in the affirmative, thus representing that the printer is being utilized by the word processor, the returned character is stored in the output buffer, as represented by block 236, and an indication is provided, as at block 238, that the pass through mode is active. This subroutine then returns to inquiry 222.

However, if inquiry 234 is answered in the negative, such that a character is not received from the word processor or from the printer, inquiry is made, at 240 as to whether a timer had been started previously. If this inquiry is answered in the negative, that timer is triggered, as at block 242. The subroutine then advances to inquire, at 244, whether the pass through mode had been active previously. If not, the subroutine merely returns to inquiry 222. However, if, prior to initiating the timer, the pass through mode had been active, the subroutine advances to block 246 to provide the display "Printer: Active/WP". This display apprises the operator that the printer had been active to print a document that had been generated at word processor 10. Thereupon, the pass through subroutine advances to inquiry 222.

However, if inquiry 240 is answered in the affirmative, that is, if the timer had been initiated prior to reaching this point in the subroutine, inquiry is made, at 248, as to whether the timer has expired. Typically, this timer is a 10-second timer, and inquiry 248 determines whether ten seconds have passed since the last character had been received from the word processor or from the printer. If inquiry 248 is answered in the negative, the subroutine merely returns to inquiry 222. However, if the timer has expired, that is, if it has "timed out", the subroutine advances to block 250 to provide the display "Printer: Idle". This apprises the operator that the printer is in its idle state and, if desired, communicator 14 may be used to store a document destined for a remote location.

While the foregoing has described the subroutines by which the routing page is stored in block memory 26 and the job file data associated with the document and included in that routing page is stored in document queue memory 28, and also has described the manner in which a document is stored in the block memory, it will be appreciated that similar subroutines are carried out to store a document received from a host, and its associated job file data, in the block and document queue memories, respectively. That is, host to communicator control section 36 (FIG. 2) may execute subroutines similar to those shown in FIGS. 4 and 5, with appropriate modifications. For example, in order to receive a document transmitted thereto, it is not necessary for an operator to actuate the "store" and "execute" keys represented by blocks 102 and 104 of FIG. 4. Furthermore, in receiving an incoming document, the routing page is not stored in block memory 26 because it need not be printed. Hence, in modifying the subroutine shown in FIG. 4 for execution by host to communicator control section 36, a negative output from inquiry 152 need merely be returned to inquiry 146. Similarly, error sensing of incoming document identifying data need not be carried out and, thus, the affirmative output of inquiry 152 may be coupled merely to block 172 rather than inquiry 162, as illustrated in FIG. 4.

Similarly, in adapting the flow chart shown in FIG. 5 for use by host to communicator control section 36 to receive an incoming document, blocks 212, 214, 216 and 218 can be omitted, and block 204 can inquire merely as to whether the end of a document has been received. Similarly, the step represented by block 208 can be modified such that the document identifying data associated with the received document is transferred from the incoming section to the print section of document queue memory 28 once a complete document has been received. Thereafter, rather than transmitting the document in block memory 26, that document is read out to and printed by printer 12. Of course, if the job file data associated with the document to be printed includes an access code, the printing of the document is inhibited until the operator of communicator 14 enters a corresponding access code. In the interest of brevity, the subroutines for executing such access code confirmation are omitted.

While the present invention has been particularly shown and described with reference to a preferred embodiment, it will be readily appreciated to those of ordinary skill in the art that various changes and modifications may be made without departing from the spirit and scope of the invention. For example, communicator 14 may be disposed normally in its pass through mode; and the presence of routing page data at the output of word processor 10 may be sensed to change over the communicator from its pass through mode to its transmit mode. That is, it need not be necessary to actuate the "store" and/or "execute" keys on the communicator keypad. Rather, the presence or absence of the routing page may be used to terminate or maintain the pass through mode.

Also, before the text data of a document is transmitted to block memory 26, either from word processor 10 or from a remote transmitting communicator, a comparison can be made between the available storage capacity of the block memory and the requisite storage space represented in the job file data associated with that document. If the block memory contains available capacity, the needed storage space is allocated and the text data then may be transferred. However, if the required storage space exceeds the available capacity of the block memory, such text data transfer is inhibited and suitable displays may be provided both at the site whereat the block memory is located and the transmitting site in the event that the document is to be transmitted from a remote location.

Other modifications in structure and operation of the present invention are contemplated, and it is intended that the appended claims be interpreted as including all such modifications and not be limited solely to the description set forth above or to the embodiments schematically represented in the accompanying drawings.

What is claimed is:

1. A method of transmitting from a source location to a remote location the text data normally coupled from a source to a printer for displaying that text data at said remote location, comprising the steps of supplying one or more successive pages of the text data from the source; identifying the horizontal and vertical positions normally printed on each page of respective characters included in the text data supplied by said source; storing the identity of each character and its horizontal and vertical positions; transmitting to said remote location the identity of each character and its horizontal and vertical positions; converting the identities of the characters and their horizontal and vertical positions to display commands for driving a display device at said remote location; and supplying said display commands to said display device to display a substantially conforming line-by-line copy of the text data supplied by said source.

2. The method of claim 1 wherein said step of transmitting to said remote location includes establishing a telephone communication link with said remote location; and transmitting the identity of each character and its horizontal and vertical positions over said telephone communication link.

3. The method of claim 2 wherein said step of transmitting the identity of each character and its horizontal and vertical positions includes the step of data compression to compress the data transmitted over said telephone communication link.

4. The method of claim 1 further comprising the steps of generating at said source location remote location identifying data for identifying the remote location at which said text data is to be displayed; and generating text identifying data for identifying the text data to be displayed at said remote location.

5. The method of claim 4 further comprising the steps of selectively generating at said source location an access code; and transmitting said access code to said remote location to restrict the display of said text data at said remote location to users furnished with said access code.

6. The method of claim 4 wherein said step of transmitting to said remote location includes transmitting said remote location identifying data, said text identifying data and said identity of each character and its horizontal and vertical positions to a central distribution center for re-transmission at a predetermined time to said remote location.

7. The method of claim 4 further comprising the steps of sensing errors in the remote location identifying data or in the text identifying data; and indicating a sensed error to enable correction thereof.

8. The method of claim 4 further comprising the step of storing at said source location said identifying data and said text data if there is sufficient storage capacity at said source location to do so, and providing an indication in the event that said storage capacity is not sufficient.

9. The method of claim 8 wherein said identifying data and said text data are stored at said source location in a nonvolatile memory device.

10. The method of claim 4 further comprising the steps of storing at said source location an indication of whether all of the identities of the characters and their horizontal and vertical positions have been transmitted from said source location, whereby incomplete transmissions are noted.

11. The method of claim 4 wherein said text identifying data includes display identifying data to identify the form in which the line-by-line copy is to be displayed at said remote location.

12. The method of claim 1 further comprising the steps of detecting the end of each page of text data supplied from said source; displaying when each page of characters is in the process of being stored; and displaying the number of the page of characters being stored.

13. A method of receiving text data in the form of character information, representative of characters to be displayed, and position information, representative of the positions on a page at which said characters are to be displayed, said method comprising the steps of receiving the character and position information in a common format regardless of the originating source of said text data; storing said character and position information; receiving job file data identifying said text data; storing said job file data; converting said common format of the stored character and position information to a display format compatible with the display device on which said text data is to be displayed; selectively displaying said text data; and providing said job file data with adjustable status information representing the status of said stored text data, including whether said text data has been displayed and whether the storage of said text data has been lost.

14. The method of claim 13 further comprising the step of selectively displaying at least a portion of said job file data and said status information.

15. The method of claim 14 wherein said job file data is stored in a nonvolatile memory device whereby said job file data is retained even if said text data is lost before being displayed, such as due to an electrical power failure condition, whereby the identification of text data that has been lost may be displayed.

16. The method of claim 13, further comprising the step of selectively deleting said stored text data and said stored job file data.

17. The method of claim 13 wherein said text data is comprised of one or more pages of characters and is stored in memory means which stores indications of the ends of said pages; and further comprising the steps of displaying the number of pages comprising the text data stored in said memory means, displaying the number of the page of the text data then being displayed on said display device, and selecting one or more desired pages of text data from said memory means to be displayed on said display device.

18. The method of claim 13, further comprising the steps of receiving plural documents in succession, each document being comprised of text data and each document being identified by said job file data; storing the text data of each document; and displaying on said display device each stored document in the order in which said documents are received.

19. The method of claim 13 wherein said job file data includes display control data for controlling predetermined characteristics of the display device on which said text data is to be displayed, thereby determining the form of the displayed text data.

20. The method of claim 19 wherein said display device is a printer for printing a fixed copy of said text data.

21. The method of claim 20 wherein said display control data includes print type data for selecting the font in which said text data is to be printed.

22. The method of claim 13 wherein said text data and said job file data are received via an unattended telephone communications link.

23. A method of selectively printing a document at a local or remote printer comprising the steps of generating text data including at least one page of printer commands that constitute said document; supplying said printer commands to said local printer when local printing of said document is selected; converting said printer commands to character information representative of the characters on each page of said text data and position information representative of the positions on each page of said characters when remote printing of said document is selected; storing the character and position information in a memory; returning to the generator of said text data signals which simulate said local printer when either local or remote printing is selected; establishing a communication link with the remote site at which said remote printer is located; and transmitting to said remote site said character and position information in a common format, substantially independent of said printer commands and of the format of said remote printer, for printing at said remote printer a line-by-line conforming version of said document.

24. The method of claim 23 further comprising the steps of sensing if said memory has sufficient available storage capacity to store said character and position information of said document; and providing a display indication if said memory does not have sufficient storage capacity available.

25. The method of claim 23 further comprising the step of displaying whether said character and position information of said document has been transmitted to said remote site, whereby incomplete transmissions are noted.

26. The method of claim 25 further comprising the step of re-transmitting said character and position information of said document in the event that an incomplete transmission is noted.

27. The method of claim 23 wherein said document is constituted by plural pages and further comprising the steps of sensing the end of each page of said document; and selectively displaying the number of the page of the document whose character and position information then are being stored in said memory.

28. The method of claim 23 further comprising the step of transmitting to said remote location access information for prohibiting the printing of said document at said remote printer until the occurrence of an event represented by said access information.

29. The method of claim 28 wherein the event represented by said access information is an authorized print request.

30. The method of claim 28 wherein the event represented by said access information is predetermined time.

31. The method of claim 23 further comprising the step of receiving an acknowledgement that said character and position information have been transmitted to said remote site.

32. The method of claim 23 further comprising the step of transmitting job file information identifying the document to be printed at said remote site and the source of said document.

33. The method of claim 32 further comprising the steps of storing plural job file informations identifying plural documents prior to transmitting said document; and utilizing the stored job file informations to selectively display the identities of documents which have been transmitted.

34. The method of claim 33 further comprising the step of selectively displaying the status of each document whose character and position information is stored in said memory, whereby an operator is apprised of whether the documents have been stored and whether the documents have been transmitted.

35. The method of claim 32 wherein said job file information includes data identifying the characteristics with which said remote printer is to print said conforming version of said document.

36. The method of claim 23 further comprising the step of printing one document at said local printer while concurrently transmitting the characters and position information of a second document.

37. Apparatus for transmitting one or more documents, constituted by text data, from a local site having a document generating source of the type having a printer output adapted to be connected to a printer, to a remote location whereat the documents are displayed, said apparatus comprising interface means coupled to said printer output for producing data signals in response to printer command signals provided at said printer output and for interacting with said document generating source if said source normally interacts with a printer connected to said printer output; conversion means for converting said data signals to a format substantially independent of said data signals and comprised of character and position information data representing the respective characters and their horizontal and vertical positions on each page of a document originated by said document generating source; storage means for storing one or more documents represented by the character and position information data; and transmission means for transmitting the stored documents to a remote location whereat the character and position information data is re-converted to display control signals for displaying the transmitted documents.

38. The apparatus of claim 37 wherein said transmission means includes means for establishing a telephone communication link with said remote location.

39. The apparatus of claim 38 wherein said means for establishing a telephone communication link includes means for setting a predetermined time at which said telephone communication link is established.

40. The apparatus of claim 38 wherein said transmission means further includes data compression means for compressing the data representing the documents transmitted to said remote location via said telephone communication link.

41. The apparatus of claim 37 further comprising manually operable means for generating document identifying data for identifying the respective documents generated by said document generating source, said document identifying data being stored in said storage means and transmitted by said transmission means.

42. The apparatus of claim 41 further including a document ID memory for storing said document identifying data to provide a record of the documents that have been generated by said document generating source.

43. The apparatus of claim 42 further comprising display means at said local site for displaying the identities of those documents which have been generated by said document generating source; and manually operable means for reading out to said display means the document identifying data stored in said document ID memory.

44. The apparatus of claim 43 further comprising means for storing status data in said document ID memory to indicate the transmission status of the documents identified by said document identifying data, whereby said display means indicates if the identified documents have been transmitted.

45. The apparatus of claim 44 wherein said document ID memory includes a nonvolatile memory device for retaining document identifying data and status data in the event of power failures.

46. The apparatus of claim 42 further comprising memory capacity means for sensing if the available capacity of said document ID memory is sufficient to store said document identifying data; and error indicating means for providing an indication if said memory capacity is not sufficient.

47. The apparatus of claim 42 wherein said manually operable means generates a security code, said security code being stored in said document ID memory and also being transmitted by said transmission means, whereby the transmitted document is displayed at said remote location only to authorized personnel represented by said security code.

48. The apparatus of claim 37 wherein said conversion means includes means for sensing the end of each page of a document; and means responsive to the sensed end of a page for displaying the number of the page of the document then being stored by said storage means.

49. The apparatus of claim 37 further comprising means at said local site for generating display control data for controlling predetermined characteristics of the display of documents at said remote location.

50. The apparatus of claim 49, further comprising a printer at said remote location for displaying documents transmitted thereto by printing fixed copies thereof; and wherein said display control data includes print type identifying data for identifying the type of print to be used for printing said documents.

51. Apparatus for receiving and selectively displaying one or more documents transmitted from a remote location in the form of graphic data constituted by character and position data representing respective characters and their horizontal and vertical positions on each page of said document, said apparatus comprising input means for receiving said data and for receiving job file data which identifies the received document and predetermined characteristics thereof; storage means for storing the character and position data constituting said graphic data and for storing the job file data; converting means for converting the character and position data to display control signals; job file display means for displaying at least portions of the job file data; and output means for supplying the display control signals to a display device to display received documents.

52. The apparatus of claim 51 wherein said input means includes automatic communication link means for providing a communication link with said remote location automatically in response to an incoming request for same.

53. The apparatus of claim 52 wherein said communication link is a telephone communication link; and wherein said graphic data is received in data compressed form.

54. The apparatus of claim 51 further comprising display status means for sensing when a received document has been displayed; and, wherein said job file display means displays the display status of received documents.

55. The apparatus of claim 54 wherein said storage means includes a nonvolatile memory for storing job file data and the display status of received documents such that the display status and identity of documents are retained in the event that the graphic data of received documents is lost, thereby providing on said job file display means a display of the identities of received documents that may or may not have been displayed.

56. The apparatus of claim 55 further comprising manually operable means for effectively deleting from said storage means and from said nonvolatile memory the graphic data and job file of a document.

57. The apparatus of claim 51 wherein each document is comprised of one or more pages of characters, and wherein said storage means stores indications of the ends of said pages, and wherein said job file display means displays the number of pages comprising a document whose graphic data is stored in said storage means and the number of the page then being supplied to the display device; and further comprising manually operable means for selecting one or more pages of the document whose graphic data is stored in said storage means to be supplied to said display device.

58. The apparatus of claim 51 wherein said output means is adapted to be connected to a printer, and wherein the predetermined characteristics of the document identified by the job file data includes the type of print used to print the received document.

59. The apparatus of claim 58 wherein said storage means includes a job file memory having an input section for storing the job file data of received documents and a print section for storing the job file data of documents selected for printing.

60. The apparatus of claim 59 further comprising means for storing in said print section of the job file memory the job file data of successive documents in the order in which those documents are received, whereby documents are selected for printing in accordance with the job file data stored in said print section.

61. The apparatus of claim 60 further comprising mode select means for selecting a first mode of operation for said apparatus, whereby each received job file data is stored in said print section, and for selecting a second mode of operation for said apparatus, whereby a received job file is not stored in said print section unless selected; and manually operable means for selecting job file data to be stored in said print section.

62. The apparatus of claim 51 wherein said job file data includes an access code; and further comprising manually operable means for entering an access code, means for comparing the entered access code with the access code of said job file data, and means for operating said output means in response to a positive comparison, whereby the display control signals are supplied to a display device.

* * * * *